United States Patent
Mogal et al.

(10) Patent No.: US 11,412,009 B1
(45) Date of Patent: Aug. 9, 2022

(54) METHODS AND SYSTEMS FOR REMOTELY LOGGING OUT REGISTERED COMMUNICATION DEVICES IN A MULTIPLE-DEVICE ACCESS ENVIRONMENT

(71) Applicant: Avaya Management L.P., Durham, NC (US)

(72) Inventors: Shahana Mogal, Pune (IN); Isha Renavikar, Pune (IN); Ananda HP, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/161,020

(22) Filed: Jan. 28, 2021

(51) Int. Cl.
*H04L 65/1083* (2022.01)
*H04L 65/1076* (2022.01)
*H04L 65/1073* (2022.01)
*H04L 65/10* (2022.01)

(52) U.S. Cl.
CPC ...... *H04L 65/1083* (2013.01); *H04L 65/1006* (2013.01); *H04L 65/1073* (2013.01); *H04L 65/1076* (2013.01)

(58) Field of Classification Search
CPC ............. H04L 65/1083; H04L 65/1073; H04L 65/1076; H04L 65/1006
See application file for complete search history.

(56) References Cited

U.S. PATENT DOCUMENTS

| | | | | |
|---|---|---|---|---|
| 7,349,690 B2 * | 3/2008 | Abdel-Kader | .......... | H04L 65/80 370/352 |
| 7,532,618 B1 * | 5/2009 | Saurabh | .................. | H04L 12/66 370/352 |
| 8,863,265 B2 * | 10/2014 | Liu | ........................ | H04L 67/142 726/9 |
| 2006/0218628 A1 * | 9/2006 | Hinton | ................ | H04L 63/0815 726/8 |
| 2007/0169175 A1 * | 7/2007 | Hall | .................... | H04L 63/0807 726/3 |
| 2013/0290494 A1 * | 10/2013 | Goudarzi | ............ | H04L 65/1083 709/219 |

* cited by examiner

*Primary Examiner* — Nam T Tran
(74) *Attorney, Agent, or Firm* — Sheridan Ross P.C.

(57) ABSTRACT

Methods and systems are provided for remotely logging out one or more registered communication devices associated with a common extension through a requesting communication device in the registered communication devices. The requesting communication device renders a list of registered communication devices associated with the extension of a user to a display. The user of the requesting communication device selects at least one of the registered communication devices, by a touch input at the display, to unregister the at least one registered communication device from the extension. In response, a message is automatically sent from the requesting communication device to a server to update the registration status of the selected at least one registered communication device. The server then terminates the registration of the at least one registered communication device from the extension associated with the user restricting the at least one registered communication device from accessing the extension.

17 Claims, 12 Drawing Sheets

METHODS AND SYSTEMS FOR REMOTELY LOGGING OUT REGISTERED COMMUNICATION DEVICES IN A MULTIPLE-DEVICE ACCESS ENVIRONMENT

BACKGROUND

The present disclosure is generally directed to telecommunications, in particular, toward the control of communication devices registered in a multiple-device access environment.

Currently, several systems exist that allow a user to login multiple Session Initiation Protocol ("SIP") devices or endpoints (e.g., with a server, etc.) simultaneously registered with the same extension. This technology is known as multiple-device access. For example, in a multiple-device access environment, a user may be simultaneously logged in to a desk-phone present at home, another (e.g., different) desk-phone at the office, and a mobile device, etc., with the same extension.

However, there is no way for a user to easily logout or unregister one or more registered communication devices from an extension that are not physically present with the user. By way of example, if a user wants to logout a particular registered communication device located at the office while the user is remote (e.g., at home, away from the office, etc.), the user in a conventional multiple-device access environment must have access to a third-party web interface or product to issue an "unregister" and/or "logout" command for the particular registered communication device. Not all users have access to such an interface. In this example, unless logged out by an administrator, or third-party web interface, the particular registered communication device would remain logged in to the extension.

Registered communication devices that continue to be logged in to an extension when the user is not present or within physical proximity of the registered communication devices, present a major security concern. For example, since each registered communication device in a multiple-device access environment has access to the same communication channel, or extension, an unauthorized person or user could use any of these registered devices to "listen in" on a conversation held over the communication channel. As can be appreciated, communications held over a common, or same, extension that are associated with a number of registered communication devices, some of which that may be outside of the direct control of a user, can result in the theft of data, breach of privacy (e.g., via eavesdropping, etc.), and/or the like.

DETAILED DESCRIPTION

Figure 1:
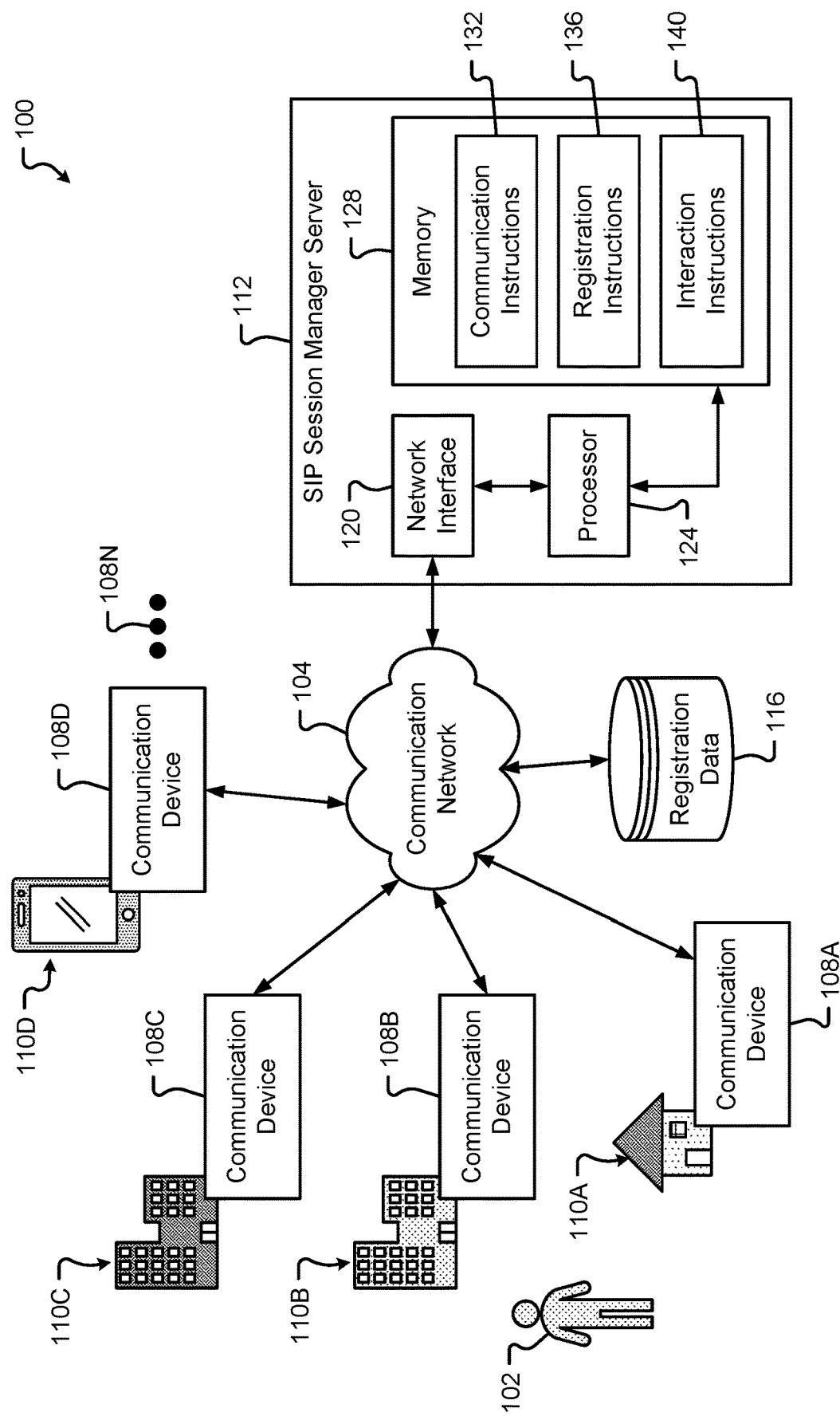
FIG. 1 depicts a block diagram of a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

It is with respect to the above issues and other problems that the embodiments presented herein were contemplated. It is an object of the present disclosure to provide an option for remotely logging out a user selectively from one or more of the user's currently registered communication devices through a communication device itself. In some embodiments, this option may be provided to the user through any communication device that the user is currently logging out of or currently has in the user's possession. As described above, conventional approaches fail to provide this type of remote logout ability directly using a registered communication device and generally require a third-party web interface or product to issue such an unregister/logout command. In these conventional approaches, the user needs to have authorization for accessing the interface. In some embodiments, and in contrast to the conventional approach for logging out, the present disclosure describes that an option is provided to a user by the communication device/endpoint itself, so that third-party access or authorization is not required. In one embodiment, the user in the present disclosure may be provided with an option for selectively logging out of certain communication devices on the basis of an Internet Protocol ("IP") address and/or a Media Access Control ("MAC") address of the communication devices.

In some embodiments, a list of all the devices that a user/extension is registered to may be displayed to the user via a display of the user's registered communication device. In this example, the user may be able to select certain registered communication devices to unregister/logout from through the physically present registered communication device that is physically present with the user. In one embodiment, the user may then be logged out/unregistered from the selected communication devices only. In some embodiments, other options may be provided to log out of all devices, log out of all devices except the current device, and/or combinations thereof.

In contrast to an option to force UNREGISTER (e.g., logout) from certain registered communication devices that a user is signed into via a web interface or a remote client, it is an aspect of the present disclosure to provide an option through an endpoint (e.g., a requesting registered communication device, etc.) for remotely logging out an extension selectively from one or more SIP and/or dual/multi-registered devices. Using this direct remote logout method and system, web interface or third-party/remote client access is not required. Providing an option through the endpoint, or registered communication device, for remotely logging out or unregistering an extension from selective SIP/dual/multi-registered devices, gives the user access control over the logged-in devices through the registered communication device that is currently available with the user.

The terms "unregister," "deregister," and "logout," and/or combinations and variations thereof, when not provided in all capitals and/or when not preceded by a protocol identifier (e.g., SIP, etc.), may be used interchangeably herein and may refer to a termination of registration of at least one particular communication device that was previously registered with an extension or communication channel and that may be associated with a user. This termination of registration prevents or otherwise restricts the at least one particular communication device from being able to access the extension or communication channel temporarily, for a predetermined amount of time, and/or permanently until re-registered with the extension or communication channel.

The terms "extension" and/or "communication channel," and variations thereof may be used interchangeably herein and may refer to a communications transmission channel that is associated with a user and that provides a dedicated channel for communications made to or from the user. The extension may correspond to a unique number associated with a user and that can be logged into (e.g., registered, etc.) via one or more communication devices to enable communications over the extension. As provided herein a user may register multiple communication devices (e.g., in multiple-device access environment, etc.) with the extension such that each of the registered communication devices can use the same communications channel to send and receive communications, messages, and/or protocol signals, etc.

Referring now to FIG. 1, a block diagram of a communication system 100 is shown in accordance with at least some embodiments of the present disclosure. The communication system 100 of FIG. 1 may be a distributed system and, in some embodiments, comprises a communication network 104 connecting one or more communication devices 108A-108N with a SIP session manager server 112. The communication system 100 may include, but is not limited to, a first communication device 108A, a second communication device 108B, a third communication device 108C, a fourth communication device 108D, a SIP session manager server 112, and a registration data database 116. In some embodiments, the communication devices 108A-108N, may be registered with a common extension associated with a particular user 102 via the SIP session manager server 112. The SIP session manager server 112 may provide collaborative communication sessions, conference meetings, multi-party calls, SIP functionality, and/or other audio/video communication services. In some embodiments, the SIP session manager server 112 allows multiple communication devices 108A-108N to be registered with the same extension number simultaneously (e.g., providing selective access to the communication channel associated with a user 102 from each registered communication device 108A-108N, etc.). Accordingly, the communication system 100 shown in FIG. 1 may be referred to herein as a multiple-device access environment.

As illustrated in FIG. 1, the user 102 may be able to access the functionality provided by the SIP session manager server 112 via one or more registered communication devices 108A-108N. In particular, each communication device 108A-108N may be registered with the SIP session manager server 112 using an extension that is associated with the user 102. The extension that is associated with the user 102 may be the same number, or communication channel, for each of the communication devices 108A-108N registered by the user 102.

Each of the communication devices 108A-108N may be associated with a particular geographical location and/or location type. For instance, and without limiting the present disclosure, the first communication device 108A may be associated with a first geographical location 110A, the second communication device 108B may be associated with the second geographical location 110B, the third communication device 108C may be associated with the third geographical location 110C, the fourth communication device 108D may be associated with the fourth geographical location 110D, and so on. It is contemplated that more or fewer communication devices than shown in FIG. 1 may be registered with the extension of the user 102. By way of example, and without limiting the present disclosure, the first geographical location 110A may correspond to the home of the user 102 and the first communication device 108A may correspond to a desktop computer communication device type located at the home of the user 102; the second geographical location 110B may correspond to a location of ownership and/or presence of the second communication device 108B, such as an office or work location, and the second communication device 108B may correspond to an office mobile communication device type (e.g., a mobile device); the third geographical location 110C may correspond to a location of ownership and/or presence of the third communication device 108C, such as an office or work location, and the third communication device 108C may correspond to a desktop computer communication device type (e.g., a static/fixed device) physically located at the third geographical location 110C; and the fourth geographical location 110D may correspond to a mobile location where the fourth communication device 108D corresponds to a mobile communication device (e.g., a Bring-Your-Own-Device ("BYOD") phone, tablet, smartphone, mobile computer, etc.) of the user 102. In some embodiments, at least one of the second communication device 108B and the fourth communication device 108D may be in the physical possession of the user 102 while the user 102 moves from one geographical location 110A, 110C to another.

It is an aspect of the present disclosure that a user 102 may remotely logout, or unregister, any of the communication devices 108A-108N in the communication system 100 regardless of the physical location of the communication devices 108A-108N. For example, a user 102 may determine, while working from home (e.g., first geographical location 110A), that any communication devices 108A-108N not in physical proximity to the user 102 should be unregistered. This determination may be made to provide enhanced security for the extension associated with the communication devices 108A-108N, prevent unintended invasions of privacy, prevent eavesdropping, and/or protect against potential theft of data.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an IP network consisting of many computers, computing networks, and other communication devices located all over the world, which are connected through many telephone systems and other means. Other examples of the communication network 104 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a Voice over IP ("VoIP") network, a SIP network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

In some embodiments, at least one of the communication devices 108A-108N may correspond to a computing device, a personal communication device, a portable communication device, a laptop, a smartphone, a tablet, a personal computer, and/or any other device capable of running an operating system ("OS"), at least one voice application, a web browser, a SIP application, and/or the like. The SIP application may be configured to exchange communications between a respective communication device 108A-108N and the SIP session manager server 112. For instance, the communication devices 108A-108N may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 108A-108N, may also have any of a variety of applications, including for example, web browser applications, chat applications, video applications, social media applications, calling applications, email applications, calendar applications, SIP applications, etc., and/or combinations thereof. In some embodiments, the communication devices 108A-108N may alternatively or additionally be any other electronic device, such as an Internet-enabled mobile telephone and/or a personal digital assistant, capable of communicating via the communication network 104.

Additionally or alternatively, communications may be sent and/or received via a respective communication device 108A-108N as a telephone call, a packet or collection of packets (e.g., IP packets transmitted over an IP network), an email message, an instant message ("IM"), a short message service ("SMS") message, a multimedia messaging service ("MMS") message, a chat, and/or combinations thereof. In some embodiments, the communication devices 108A-108N may communicate over an audio and/or a video channel over the communication network 104.

The SIP session manager server 112 may include hardware and/or software resources that, among other things, provides the ability for multiple-device access where two or more of the communication devices 108A-108N are registered simultaneously with an extension of a user 102. Among other things, the SIP session manager server 112 may provide SIP functionality allow the communication devices 108A-108N to hold multi-party calls, conference calls, and/or other collaborative communications over a same communication channel, or extension, that is associated with a user 102. The SIP session manager server 112 may include a network interface 120, a processor 124, and a memory 128. The user 102 may comprise communication instructions 132, registration instructions 136, interaction instructions 140, registration data, and/or the like.

The network interface 120 provides the SIP session manager server 112 with the ability to send and receive communication packets or the like over the communication network 104. The network interface 120 may be provided as a network interface card ("NIC"), a network port, a modem, drivers for the same, and the like. Communications between the components of the SIP session manager server 112 and other devices connected to the communication network 104 may flow through the network interface 120 of the SIP session manager server 112. In some embodiments, examples of a suitable network interface 120 include, without limitation, an antenna, a driver circuit, an Ethernet port, a modulator/demodulator, an NIC, an RJ-11 port, an RJ-45 port, an RS-232 port, a USB port, etc. The network interface 120 may include one or multiple different network interfaces depending upon whether the SIP session manager server 112 is connecting to a single communication network or multiple different types of communication networks. For instance, the SIP session manager server 112 may be provided with both a wired network interface and a wireless network interface without departing from the scope of the present disclosure. In some embodiments, the network interface 120 may include different communications ports that interconnect with various input/output lines.

In some embodiments, the processor 124 may correspond to one or more computer processing devices. For example, the processor 124 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 124 may be provided as a Central Processing Unit ("CPU"), a microprocessor, or a plurality of microprocessors that are configured to execute the instructions sets stored in memory 128. Upon executing the instruction sets stored in memory 128, the processor 124 enables various communications, registration (e.g., registering, unregistering, updating registration, etc.) and/or interaction functions of the SIP session manager server 112, and provides communications over an extension for one or more registered communication devices (e.g., communication devices 108A-108N, etc.) over the communication network 104.

The memory 128, or storage memory, may correspond to any type of non-transitory computer-readable medium. In some embodiments, the memory 128 may comprise volatile or non-volatile memory and a controller for the same. Non-limiting examples of the storage memory 128 that may be utilized in the SIP session manager server 112 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 128 may be used to store information about registrations, extensions, users, authentication, activity status, history, and/or the like. In some embodiments, the memory 128 may be configured to store rules and/or the instruction sets depicted in addition to temporarily storing data for the processor 124 to execute various types of routines or functions. Although not depicted, the memory 128 may include instructions that enable the processor 124 to store data into a registration data database 116 and retrieve information from the registration data database 116. In some embodiments, the registration data database 116 or data stored therein may be stored internal to the SIP session manager server 112 (e.g., within the memory 128 of the SIP session manager server 112 rather than in a separate database) or in a separate server.

The communication instructions 132, when executed by the processor 124, may provide the ability for at least one of the communication devices 108A-108N registered with an extension of a user 102 at the SIP session manager server 112 to conduct SIP messaging, hold or conduct communications, and/or otherwise send and receive messages via the extension. In accordance with embodiments of the present disclosure the communication instructions 132 may comprise instructions that, when executed by the processor 124, enable a multiple-device access environment for the communication devices 108A-108N in the communication system 100. Among other things, the communication instructions 132 may allow a user 102 to have multiple communication devices 108A-108N, or endpoints, simultaneously registered with an extension of the user 102. For example, a user 102 may receive and place calls via multiple communication devices 108A-108N and even move calls between communication devices 108A-108N that are registered with the extension of the user 102. In one embodiment, this multiple-device access environment may be used by a single user 102 and is not intended to be used by multiple users sharing the various communication devices 108A-108N that are registered with the extension of the single user 102. Additionally or alternatively, the communication instructions 132 may integrate all communication devices 108A-108N across the communication system 100 and may even use existing private branch exchange ("PBX") equipment, services, and/or infrastructure. The SIP session manager server 112 and the processor 124 executing the communication instructions 132 may enable SIP routing and integration. Examples of other functions performed via the communication instructions 132, when executed by the processor 124, include, but are in no way limited to, normalizing disparate networks, providing centralized routing of calls and management of user profiles, supporting converged voice and video bandwidth management, providing application sequencing capabilities, etc., and/or combinations thereof.

The SIP session manager server 112 may comprise registration management resources, such as the registration instructions 136 and/or other registration data stored in the memory 128 and/or the registration data database 116. In some embodiments, the registration instructions 136, when executed by the processor 124, may send and receive messages across the communication network 104 to one or more communication devices 108A-108N in the communication system 100 for enabling the remote logout methods described herein. The registration instructions 136 may define rules and instructions for registering or unregistering (e.g., terminating registration, etc.) one or more selected communication devices 108A-108N in the communication system 100 at the request of a communication device 108A-108N that is registered with the extension of the user 102. For instance, the registration instructions 136, when executed by the processor 124, may cause the processor 124 to receive query messages requesting identification of registered communication devices 108A-108N with an extension, send a query response message with the identification to a requesting communication device 108A-108N, receive an unregister message (e.g., requesting a particular communication device 108A-108N be unregistered from the extension) from the requesting communication device 108A-108N, and send an unregister message to the particular communication device 108A-108N that terminates a registration of the particular communication device 108A-108N with the extension. Additionally or alternatively, the registration instructions 136, when executed by the processor 124, may create, delete, modify, and/or otherwise update registration records (e.g., registration data structures, etc.) for at least one of extensions, users, communication devices, etc., and/or combinations thereof. The registration instructions 136 may work in conjunction with the communication instructions 132, or vice versa, to perform at least some steps of the methods described in conjunction with FIGS. 7 and 8, and as described herein.

The interaction instructions 140 may define rules and instructions for interactions between the SIP session manager server 112 and at least one of the communication devices 108A-108N in the communication system 100. The interaction instructions 140 may cause applications, web pages, pop-ups, and/or other digital interactions to be presented by the display of a communication device 108. The interaction instructions 140, when executed by the processor 124, may determine to present a user 102 with one or more remote logout pages, logout options, registration information, or other requests for input. These interactions may be provided by sending a message to a registered communication device 108A-108N over the communication network 104 in the communication system 100 causing a display device of the registered communication device 108A-108N to render information and user-selectable options. The interaction instructions 140 may work in conjunction with the registration instructions 136, or vice versa, to perform at least some steps of the methods described in conjunction with FIGS. 7 and 8, and as described herein.

Figure 2:
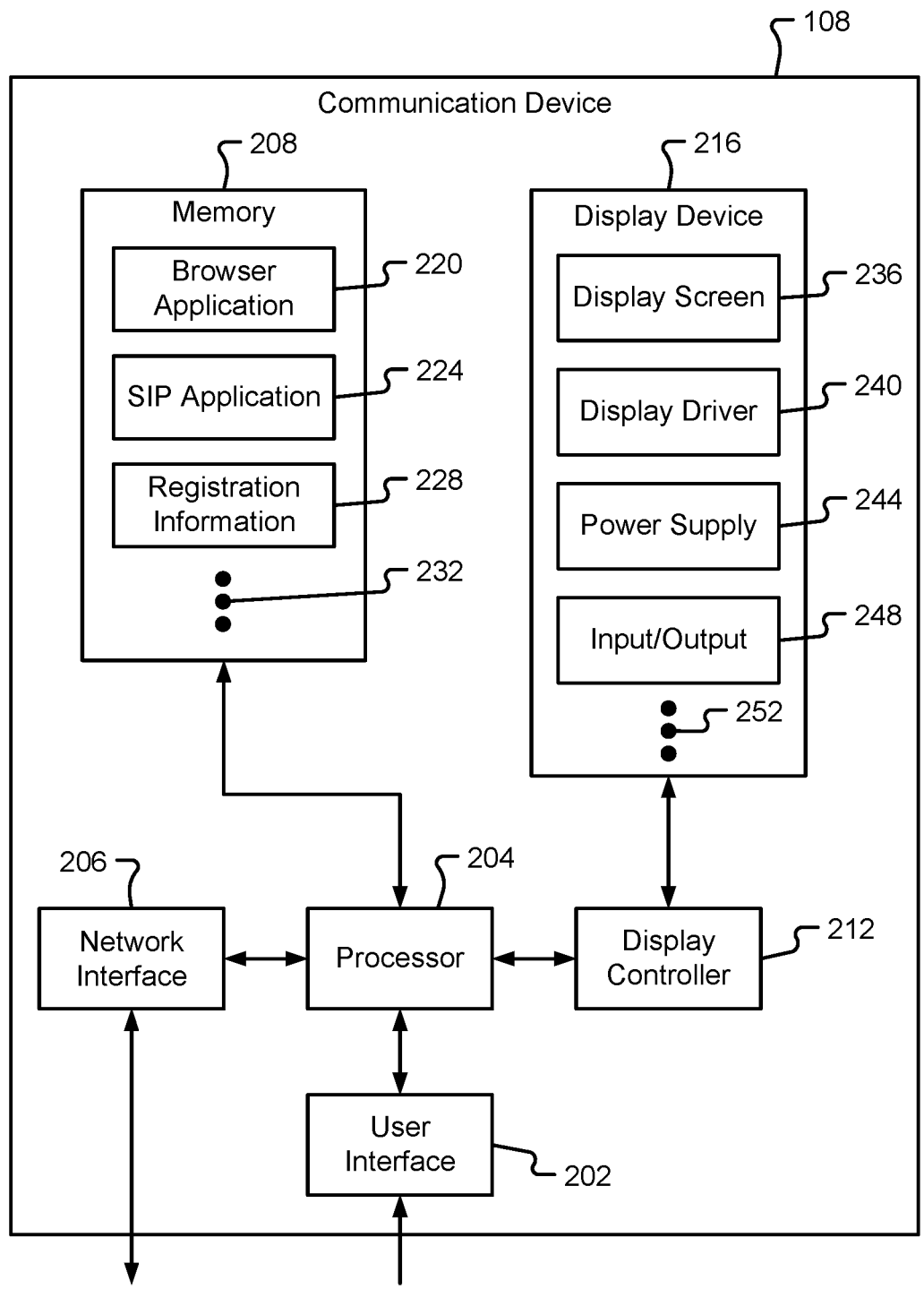
FIG. 2 is a block diagram depicting components of a communication device used in a communication system in accordance with at least some embodiments of the present disclosure.

FIG. 2 is a block diagram depicting components of a communication device 108 used in the communication system 100 in accordance with at least some embodiments of the present disclosure. The communication device 108 may correspond to any of the communication devices 108A-108N described in conjunction with FIG. 1, and vice versa. The communication device 108 is shown to include a computer memory 208 that stores one or more instruction sets, applications, rules, information, or modules. The communication device 108 may be configured as a desktop computer, smartphone, tablet, laptop, and/or the like. The communication device 108 is also shown to include a user interface 202, one or more processors 204, a network interface 206 (e.g., a network communications interface, etc.), and a display controller 212 that may all be connected to one another via a power and/or a communications bus.

The user interface 202 may correspond to any type of input and/or output device, or combination thereof, that enables a user 102 to interact with the communication device 108. As can be appreciated, the nature of the user interface 202 may depend upon the nature of the communication device 108. Examples of the user interface 202 may include, but are in no way limited to, user interface hardware and devices such as at least one touch-sensitive display elements, buttons, switches, keyboards, peripheral interface devices (e.g., mice, controller, joysticks, etc.) as described herein. It is an aspect of the present disclosure that one or more devices in the user interface 206 may provide an input that is interpreted by the processor 204 in controlling one or more components of the communication device 108.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARIV1926EJS™ processors, other industry-equivalent processors, and may perform computational functions using any known or future-developed standard, instruction set, libraries, and/or architecture. The processor 204 may be a multipurpose, programmable device that accept digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system. The processor 204 may be similar, if not identical, to the processor 124 described in conjunction with FIG. 1, or vice versa.

The network interface 206 may comprise hardware that facilitates communications with other communication devices (e.g., the SIP session manager server 112, other communication devices and/or servers, etc.) over the communication network 104. In some embodiments, the network interface 206 may include an Ethernet port, a Wi-Fi card, an NIC, a cellular interface (e.g., antenna, filters, and associated circuitry), or the like. The network interface 206 may be configured to facilitate a connection between the communication device 108 and the SIP session manager server 112 via the communication network 104 and may further be configured to encode and decode communications (e.g., packets, etc.) according to a protocol utilized by the communication network 104.

The memory 208 may correspond to any type of non-transitory computer-readable medium. In some embodiments, the memory 208 may comprise volatile or non-volatile memory and a controller for the same. Non-limiting examples of memory 212 that may be utilized in the communication device 108 may include RAM, ROM, buffer memory, flash memory, solid-state memory, and/or variants thereof. Any of these memory types may be considered non-transitory computer memory devices even though the data stored thereby can be changed one or more times. In some embodiments, the memory 208 may be configured to store rules and/or the instruction sets depicted in addition to temporarily storing data for the processor 124 to execute various types of routines or functions. The computer memory 208 may store the browser application 220, SIP application 224, registration information 228, and/or more 232.

The browser application 220 stored in the computer memory 208 of the communication device 108 may correspond to any application program that provides access to network (e.g., LAN, Internet, World Wide Web, etc.) content. Examples of the browser application 220 may include, but are in no way limited to, Microsoft® Internet Explorer, Microsoft® Edge, Google® Chrome, Mozilla Firefox®, Apple® Safari, and/or the like. In some embodiments, the browser application 220 may run a browser-based application. The browser-based application may run via the SIP session manager server 112 and interact with the communication device 108. In one embodiment, the presentations, interactions, and content described herein may be rendered to the communication device 108 via at least one window and/or page of the browser application 220.

The SIP application 224 stored in the computer memory 208 of the communication device 108 may correspond to an application that, when installed on the communication device 108, allows the communication device 108 to be used as a SIP client for a VoIP service. Additionally or alternatively, the SIP application 224 may correspond to an application that enables VoIP calling, access to contact lists, access to voicemail, access to scheduled meetings (e.g., via a digital calendar), chat functionality, unified communications, and/or the like, via an extension associated with the user 102. The communication device 108 may send and receive SIP messages across the communication network 104 via the SIP application 224 running on the communication device 108. In one embodiment, the communication device 108 may send commands, instructions, SIP messages, and/or other messages across the communication network 104 to at least one of the communication devices 108A-108N directly or indirectly (e.g., via the SIP session manager server 112, other servers, etc.). Additionally or alternatively, the communication device 108 may receive commands, instructions, SIP messages, and/or other messages from at least one of the communication devices 108A-108N, the SIP session manager server 112, other servers, etc. For instance, the user 102 may send SIP UNREGISTER messages, and other SIP messages, from the communication device 108 (e.g., to the SIP session manager server 112, etc.) when requesting that a particular registered communication device 108A-108N in the communication system 100 be unregistered from an extension of the user 102. Prior to sending the SIP UNREGISTER messages, the user 102 may send a query message (e.g., requesting an identification of registered communication devices 108A-108N associated with an extension of the user 102, etc.) in the form of a SIP REGISTER message to the SIP session manager server 112. One or more of these SIP messages may be sent as part of the SIP application 224 running on the communication device 108. Data used by the SIP application 224 may be stored locally on the communication device 108, in a registration data database 116, with the SIP session manager server 112, and/or on a voice service (e.g., one or more VoIP carrier servers, databases, systems, etc.).

The registration information 228 may comprise data about a registration status associated with an extension of the user 102 for one or more communication devices 108A-108N in the communication system 100. The registration information 228 may comprise an identification of each communication device 108A-108N, the extension, and the user 102 associated with the extension. In some embodiments, the registration information 228 may comprise authentication information (e.g., access credentials, passwords, etc.). Additionally or alternatively, the registration information 228 may comprise data about device activity (e.g., location of a communication device 108A-108N over time, use of the communication device 108A-108N over time, battery power, and/or the like. Other information stored in the registration information 228 location of the computer memory 208 may comprise registration history (e.g., registration times, termination of registration times, amount of time logged in, amount of time logged out, etc.) for a particular communication devices 108A-108N in the communication system 100. Examples of the registration information 228 may include, but is in no way limited to, the data described in conjunction with the registration data structure 300 of FIG. 3.

In some embodiments, the communication device 108 may comprise at least one display device 216 that renders information, applications, windows, interactive elements, and/or other visual output to at least one display screen 236. The communication device 108 may include at least one display controller 212 that controls an operation of the display device 216. This operation may include the control of input (e.g., input provided by the user 102 via the user interface 202, command input via the instruction sets in memory 208, and/or combinations thereof, etc.), output (e.g., display, rendered images, window behavior, etc.) and/or other functions of the display device 216 and a display controller 212.

As described above, the display device 216 may comprise at least one display screen 236 that selectively activates pixels and/or display elements to render one or more applications, windows, controls, interactive elements, icons, characters, images, etc. Examples of the display screen 236 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device 216 may be configured to render information in one or more discrete areas (e.g., areas, backgrounds, portions, windows, zones, etc.) of the display screen 236 or superimposed in an area of the display screen 236.

The display device 216 may include a display driver 240, a power supply 244, an input/output 248, and/or other components 252 that enable operation of the display device 216. The display driver 240 may receive commands and/or other data provided by the processor 204 and one or more of the instruction sets in memory 208. In response to receiving the commands, the display driver 240 may generate the driving signals necessary to render the appropriate images to the display screen 236.

The power supply 244 may provide electric power to one or more components of the display device 216. In one embodiment, the power supply 252 may include a transformer and/or other electronics that prevent overloading, condition power signals, and/or provide backup power to the display device 216. The input/output 248 may correspond to one or more connections for receiving or exchanging information and/or video from components of the communication device 108 (e.g., the processor 204, etc.). The input/output 248 may comprise a high-definition multimedia interface ("HDMI") input, DisplayPort ("DP") input, Ethernet, composite video, component video, H.264, or some other video connection type.

Figure 3:
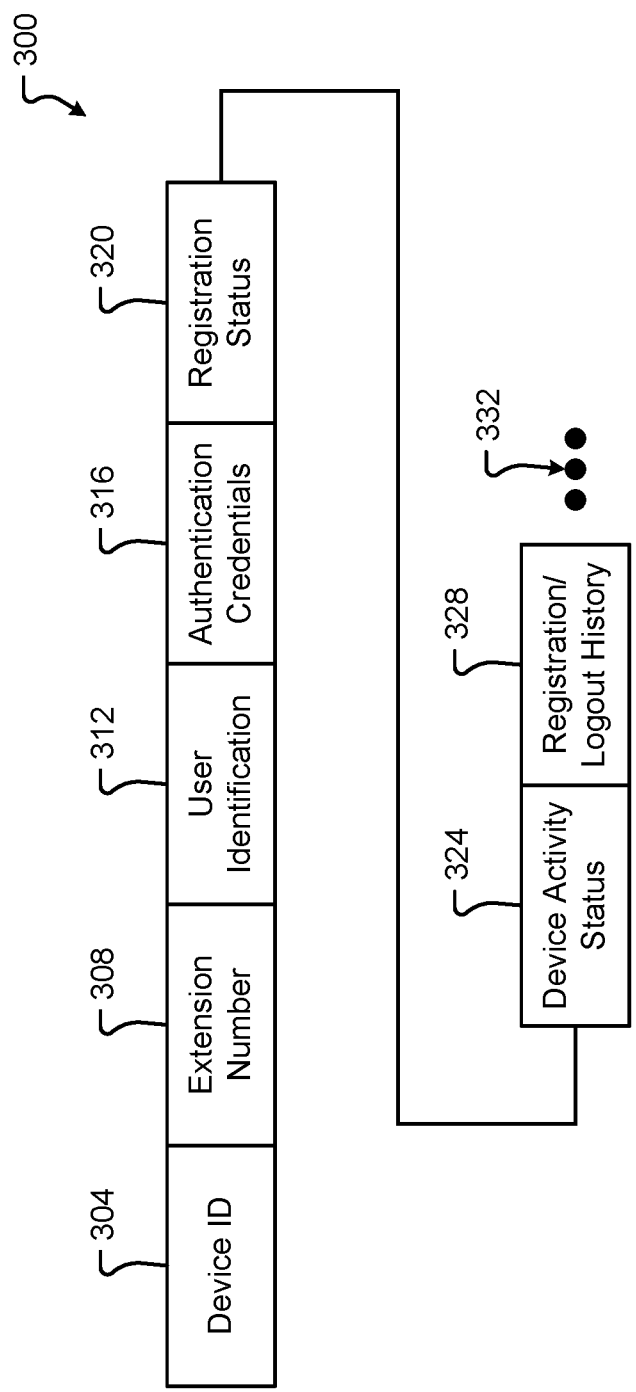
FIG. 3 is a block diagram depicting a communication device registration data structure used in accordance with embodiments of the present disclosure.

Referring to FIG. 3, a block diagram depicting a registration data structure 300 will be described in accordance with at least some embodiments of the present disclosure. The registration data structure 300 may include a number of fields that may be used in the various communication flows, methods, and processes outlined herein. For instance, the registration data structure 300 shown may be associated with a particular communication device 108A-108N associated with a user 102, an extension of the user 102, and/or the user 102. In some embodiments, the registration data structure 300 may be stored in the registration data database 116 and/or the memory 128 of the SIP session manager server 112. Information stored in the registration data structure 300 may be used by the SIP session manager server 112 to determine registered communication devices 108A-108N associated with a particular user 102 and/or extension of the user 102. In some embodiments, the communication device 108 may send a request (e.g., a query message, SIP REGISTER message, etc.) to the SIP session manager server 112 that requests identification of all the communication devices 108A-108N registered with the extension of a user 102. At least some, or even all, the information stored in the registration data structure 300 may be provided to the communication device 108, by the SIP session manager server 112, in response to the request made. Examples of the registration data structure 300 data fields include, without limitation, a device identification field 304, an extension number field 308, a user identification field 312, an authentication credentials field 316, a registration status field 320, a device activity status field 324, a registration/logout history field 328, and more 332.

The device identification field 304 may comprise data used to identify or describe a particular communication device 108 from communication devices 108A-108N in the communication system 100. This identification may be a name, phrase, word, symbol, number, character, and/or combinations thereof. The identification may include an Integrated Circuit Card Identification ("ICCID") number, International Mobile Equipment Identity ("IMEI"), International Mobile Subscriber Identity ("IMSI") number, IP address, MAC address, etc., and/or any other data used to uniquely identify one communication device 108 from another in the communication devices 108A-108N associated with an extension of the user 102. In some embodiments, the data stored in the device identification field 304 may be used by a registered communication device 108 of a user 102 when making an unregister request and/or when directly issuing a registration termination message that comprises instructions that unregisters a particular (e.g., user-selected) registered communication device 108 from the extension of the user 102. For instance, after receiving the query response message from the SIP session manager server 112 (e.g., listing all of the registered communication devices 108A-108N, etc.), the registered communication device 108 of the user 102, from which the query was made, may use the device identification to directly communicate with one or more selected registered communication devices 108A-108N to be unregistered, or logged out, from the extension of the user 102. This direct communication may include sending the registration termination message to the one or more selected registered communication devices 108A-108N to be unregistered, without sending an unregister request to the SIP session manager server 112. Stated another way, the registered communication device 108 of the user 102, from which the query was made, sends the registration termination message to the one or more selected registered communication devices 108A-108N to be unregistered in lieu of the SIP session manager server 112 sending the registration termination message to the one or more selected registered communication devices 108A-108N to be unregistered.

The extension number field 308 may comprise data used to identify or otherwise describe a particular extension of a user 102. The extension number may be a number, character, symbol, digits, etc., and/or combinations thereof. In some embodiments, the extension number may correspond to a typical phone extension number comprising a plurality of digits. As provided above, one or more communication devices 108A-108N may be associated with the extension associated with a user 102, and the extension number may be used to uniquely identify the extension of one user 102 from another in the communication system 100. In some embodiments, and as provided by the multiple-device access environment, the extension used by each communication device 108A-108N, that is associated with a user 102, has the same extension number. Different users have different extensions, and different extension numbers, and each user 102 may have one or more communication devices registered with their own extension in the multiple-device access environment and communication system 100.

The topic field 308 may comprise data used to identify a subject, topic, or content of the conference meeting identified in the conference identification field 304. The topic may include information that includes a word, phrase, agenda, code word, acronym, and/or the like. In some embodiments, the information in the topic field 308 may identify a reason for holding the conference meeting identified in the conference identification field 304.

The user identification field 312 may comprise data about the user 102 associated with the extension and/or the registered communication devices 108A-108N. This data may include a name, identifier, email address, employee number, alias, symbol, photo, icon, character, or other string of characters to differentiate one user 102 from another in the communication system 100. The SIP session manager server 112 may refer to the information in the user identification field 312 to determine associated registered communication devices 108A-108N, extension number, etc.

The authentication credentials field 316 may comprise data corresponding to stored credentials for the user 102, which are associated with the extension of the user 102 and/or the registered communication devices 108A-108N of the user 102. These credentials may include passwords, passcodes, keys (e.g., public keys, private keys, etc.), access tokens, and/or any other authentication information used in accessing a communication device 108A-108N and/or an extension (e.g., the extension defined in the extension number field 308 of the registration data structure 300, etc.) of the user 102.

The registration status field 320 may comprise data corresponding to a current registration of a communication device 108 identified in the device identification field 304. The registration status may define whether a particular communication device 108 in the communication devices 108A-108N is "registered," "unregistered," "registering," "unregistering," "not yet registered," etc., and/or the like. When a particular communication device 108 is registered with the extension of the user 102, the particular communication device 108 may be able to send and receive messages via the extension of the user 102. In some embodiments, a registered communication device 108 uses the credentials, codes, etc., stored in the authentication credentials field 316 of the registration data structure 300.

The device activity status field 324 may comprise data corresponding to a usage activity and/or a usage inactivity of a particular communication device 108 in the communication devices 108A-108N. Usage activity may comprise times of use, locations of use (e.g., as determined by a Global Positioning System ("GPS") radio navigation system, or other location determination system of the communication device 108, etc.), usage over time, movement over time, etc., and/or whether the communication device 108 is in an "available" state, a "busy" state, or an "in use" state. Usage inactivity may comprise times when a communication device 108 is typically not in use (e.g., at night, on weekends, etc.), and/or whether the communication device 108 is in an "away" state or "unavailable" state, etc. In some embodiments, the remote logout methods and systems described herein may utilize information in the device activity status field 324 to determine details about one or more communication devices 108A-108N prior to, during, or after requesting a remote logout of a particular communication device 108 in the communication devices 108A-108N.

The registration/logout history field 328 may comprise data corresponding to registrations and/or terminations of registrations made for a particular communication device 108 identified in the device identification field 304 of the registration data structure 300. In some embodiments, the registration/logout history field 328 may be used to record a time of registration, a time of termination of registration (e.g., unregistration), an identity of the initiator (e.g., the identification of the user 102 stored in the user identification field 312, an identification of an administrator in the case of a forced register/unregister command, etc.) of a register and/or an unregister command, a frequency of register and/or unregister commands issued for a particular communication device 108, and/or the like. In some embodiments, the SIP session manager server 112 may determine a behavior of registers and/or unregisters associated with a particular communication device 108 of the communication devices 108A-108N. In one example, based on this behavior determined, the SIP session manager server 112 may provide a predictive notification (e.g., a pop-up, a toast, a message, etc.) to a user 102 via a different communication device 108 that prompts the user 102 to logout from the particular communication device 108.

Figure 4:
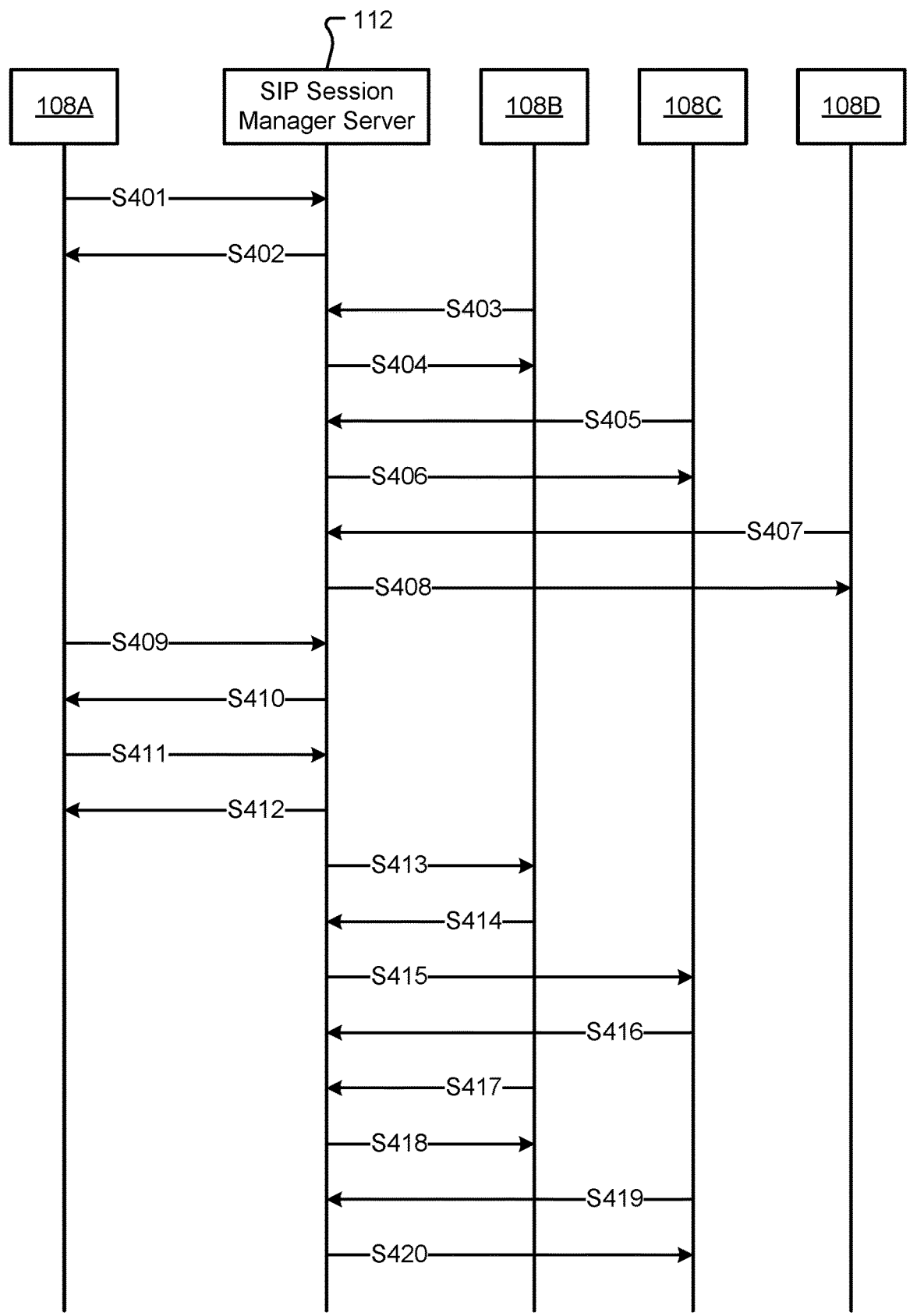
FIG. 4 is a diagram depicting a set of communication flows in accordance with at least some embodiments of the present disclosure.

With reference now to FIG. 4, a set of communication flows will be described in accordance with at least some embodiments of the present disclosure. The communication flows begin when a first communication device 108A sends a SIP REGISTER message to the SIP session manager server 112 (step S401). This communication may correspond to a registration process used to register the first communication device 108A with the SIP session manager server 112 and the extension of the user 102. In response, the SIP session manager server 112 sends a SIP 200 OK message to the first communication device 108A indicating that the first communication device 108A has been successfully registered (step S402). Although shown as a SIP REGISTER message and a SIP 200 OK message in FIG. 4, it should be appreciated that the registration process of a particular communication device 108 with the SIP session manager server 112 and the extension of the user 102 may include more communications than shown. For instance, the registration process of the first communication device 108A with the SIP session manager server 112 may include the first message (e.g., a SIP REGISTER message, etc.) sent by the first communication device 108A, a challenge message (e.g., a SIP 401 Unauthorized message, etc.) sent by the SIP session manager server 112, a second message (e.g., a second SIP REGISTER message, etc.) from the first communication device 108A, and an acceptance message (e.g., a SIP 200 OK message, etc.) from the SIP session manager server 112, etc. For the sake of clarity in disclosure, the registration process of a particular communication device 108 will be described herein as comprising a SIP REGISTER message and a SIP 200 OK message.

Next, the second communication device 108B may register with the extension of the user 102 by sending a SIP REGISTER message to the SIP session manager server 112 (step S403). In response, the SIP session manager server 112 sends a SIP 200 OK message to the second communication device 108B indicating that the second communication device 108B has been successfully registered with the extension (step S404). This registration process repeats for any other communication devices 108C-108N that are to be registered. For instance, the third communication device 108C sends the SIP REGISTER message to the SIP session manager server 112 at step S405 and receives a SIP 200 OK message from the SIP session manager server 112 at step S406. Similarly, the fourth communication device 108D sends the SIP REGISTER message to the SIP session manager server 112 at step S407 and receives a SIP 200 OK message from the SIP session manager server 112 at step S408. At this point, the first communication device 108A, second communication device 108B, third communication device 108C, and the fourth communication device 108D are all registered via the SIP session manager server 112 with the extension of a user 102. This multiple-device registration process enables the multiple-device access environment and communication system 100 described herein.

Next, the first communication device 108A sends a query message requesting an identification of registered communication devices 108A-108N associated with the extension of the user 102 (step S409). The query message may correspond to a SIP REGISTER message that queries for all registered contacts, or communication devices 108A-108N, for the user 102 and the extension of the user 102. In response, the SIP session manager server 112 may send a query response message comprising the identification of the registered communication devices 108A-108N associated with the extension to the registered first communication device 108A (step S410). In some embodiments, the query response message may correspond to a SIP 200 OK message sent by the SIP session manager server 112 that returns all recorded bindings (e.g., registrations, etc.) for the extension.

As described herein, the user 102 may be presented with a graphical representation of all the registered communication devices 108A-108N associated with the extension via the display device 216 of the first communication device 108A. The graphical representation may be in the form of a list (e.g., icons, lines, grids, tables, etc.). The user 102 may then select one or more registered communication devices 108A-108N from the list to unregister, or logout.

Once the user 102 selects at least one of the registered communication devices 108A-108N to remotely logout, the first communication device 108A may send an unregister message comprising instructions to unregister the at least one registered communication devices 108A-108N from the extension (step S411). In some embodiments, this message may be sent as a SIP NOTIFY message comprising a list of bindings to be terminated (e.g., unregister second communication device 108B, third communication device 108C). The SIP session manager server 112 may send a message acknowledging receipt of the SIP NOTIFY message (step S412). This acknowledgment may be sent as a SIP 200 OK message.

In response to receiving the unregister message from the first communication device 108A, the SIP session manager server 112 may send a registration termination message to the registered second communication device 108B comprising instructions that terminates a registration of the registered second communication device 108B with the extension (step S413). The registration termination message may be sent by the SIP session manager server 112 to the second communication device 108B as part of a SIP NOTIFY message. This SIP NOTIFY message may define that EVENT reg status=terminated. The second communication device 108B may respond with an acknowledgment message (e.g., in the form of a SIP 200 OK message, etc.) in step S414. Similarly, the SIP session manager server 112 may send the registration termination message to the registered third communication device 108C comprising instructions that terminates a registration of the registered third communication device 108C with the extension (step S415). The registration termination message may be sent by the SIP session manager server 112 to the third communication device 108C as part of a SIP NOTIFY message (e.g., defining, EVENT reg status=terminated, etc.). The third communication device 108C may respond with an acknowledgment message (e.g., in the form of a SIP 200 OK message, etc.) in step S416.

In some embodiments, the second communication device 108B may send an unregister confirmation message indicating that the registration of the second communication device 108B has been set to zero, or logged out (step S417). In some embodiments, this unregister confirmation message may be sent as a SIP REGISTER message defining that the registration expiration corresponds to expires=0. The SIP session manager server 112 may confirm receipt of this unregister confirmation message in the form of a SIP 200 OK message (step S418). In some embodiments, the SIP session manager server 112 may update any records storing a registration status of the second communication device 108B. Similarly, the third communication device 108C may send an unregister confirmation message indicating that the registration of the third communication device 108C has been set to zero, or logged out (step S419). In some embodiments, this unregister confirmation message may be sent as a SIP REGISTER message defining that the registration expiration (e.g., for the third communication device 108C) corresponds to expires=0. The SIP session manager server 112 may confirm receipt of this unregister confirmation message in the form of a SIP 200 OK message (step S420). In some embodiments, the SIP session manager server 112 may update any records storing a registration status of the third communication device 108C. It is an aspect of the present disclosure that any updated registration status may be sent to the first communication device 108A after the remote logout communications have been exchanged. One or more of the communications described in conjunction with FIG. 4 may be repeated for to reregister new, or previously unregistered, communication devices 108A-108N or unregister other communication devices 108A-108N that have been registered with the extension of the user 102.

Additionally or alternatively, the registered first communication device 108A of the user 102 may send the registration termination message directly to the communication device(s) 108A-108N to be logged out. In one embodiment, upon receiving the IP address and/or other device identification data of the registered communication devices 108A-108N (e.g., from the SIP session manager server 112, etc.), the registered first communication device 108A of the user 102 may send the registration termination message directly to the registered communication device(s) 108A-108N to be logged out across the communication network 104 using the address information for each of the registered communication devices 108A-108N (e.g., stored in the device identification field 304 of the registration data structure 300, etc.). In some embodiments, the first communication device 108A may logout a different registered communication device 108B-108N than the first communication device 108A. In one embodiment, the first communication device 108A may logout any registered communication device 108A-108N including the first communication device 108A.

In some embodiments, depending on the communication device 108 of the user 102, used to make the unregister request, the messages and communication flows described above may include messages sent to one or more other servers that exist between the communication device 108 and the SIP session manager server 112. For example, the communication device 108 of the user may comprise a Computer Telephony Interface ("CTI") application. In this case, the communication device 108 may be referred to as a CTI-client. Among other things, CTI may allow call control by a third party. CTI may be used in unified communication applications and/or contact center fields. In one embodiment, CTI may allow any authorized application to control a separate device for the purposes of, for example, making calls, controlling existing calls, or controlling associated communication devices 108A-108N. In this example, the query message (S409) may be send from the CTI-client to an application enablement server (e.g., that enables the functionality of the CTI-client, applications running via one or more resources of the CTI-client, etc.) before being sent to the SIP session manager server 112. Next, the query message may be sent to a communication server (e.g., IP EPBX or CTI-Server, etc.). The communication server may correspond to an enterprise IP-EPBX, that interconnects the application enablement server and the SIP session manager server 112. Continuing this example, the query response message (S410) may be send from the SIP session manager server 112 to the communication server, then to the application enablement server, and then to the CTI-client. At the CTI-Client, a list of all the registered endpoints/communication devices may be rendered to the display device 216 of the CTI-client from which the user 102 is allowed to make logout requests. The logout request may be in the form of an unregister message comprising instructions to unregister the at least one registered communication devices 108A-108N from the extension (e.g., step S411). Continuing the example above, the unregister message may be sent from the CTI-client to the application enablement server, then to the communication server, and then to the SIP session manager server 112.

Figure 5A:
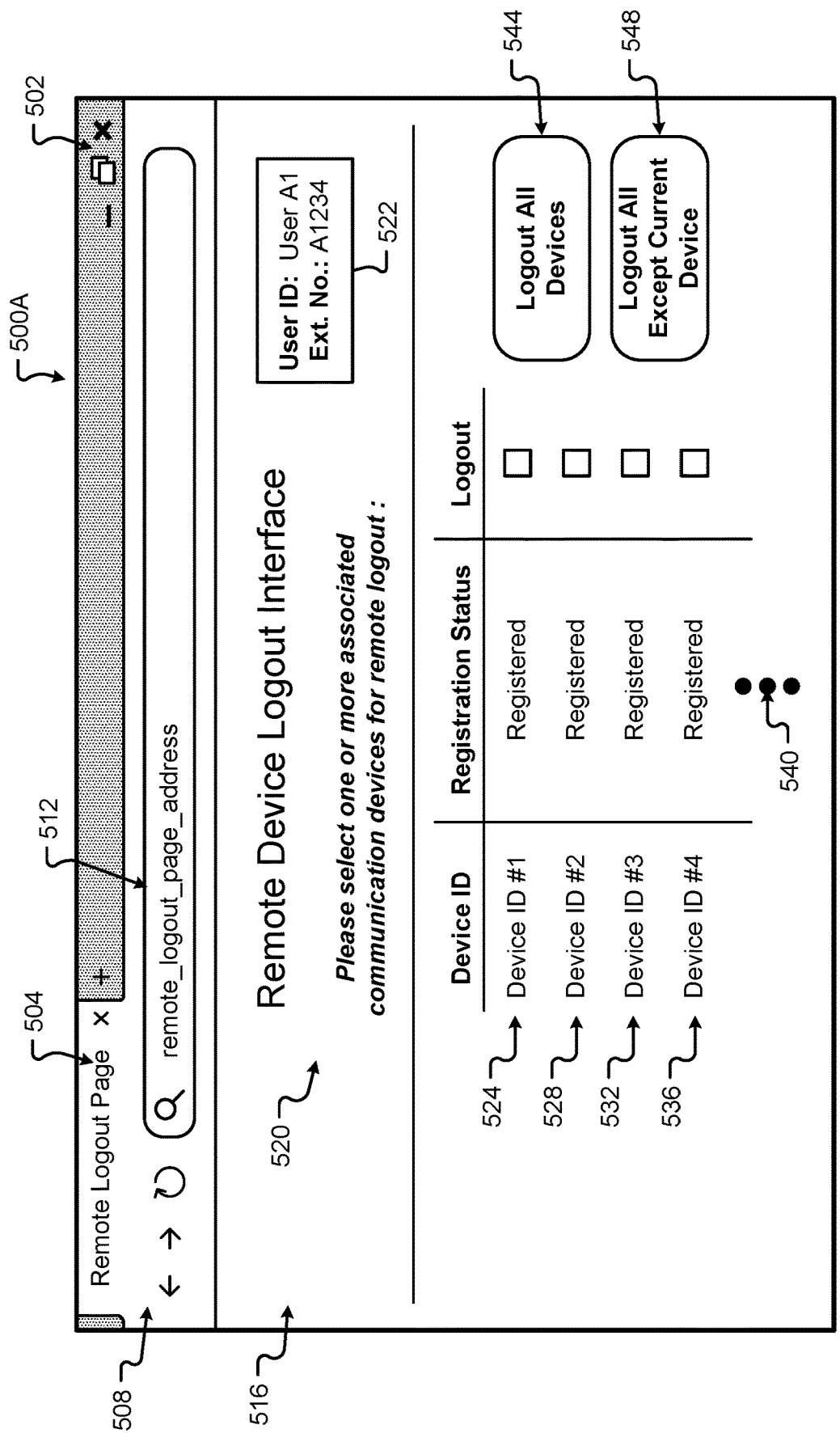
FIG. 5A is a block diagram depicting a first remote communication device logout interface presentation in accordance with embodiments of the present disclosure.
Figure 5B:
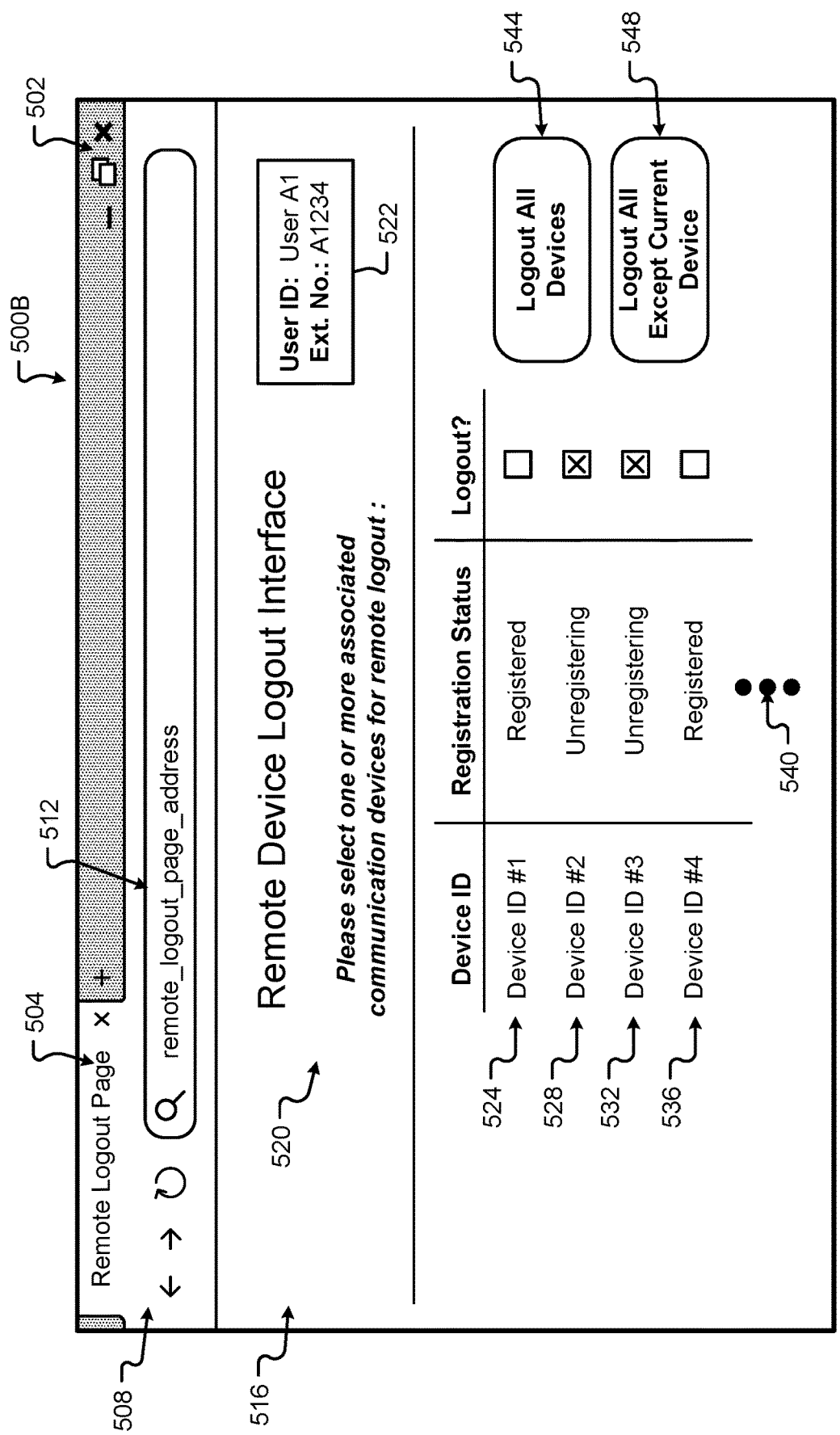
FIG. 5B is a block diagram depicting a second remote communication device logout interface presentation in accordance with embodiments of the present disclosure.
Figure 5C:
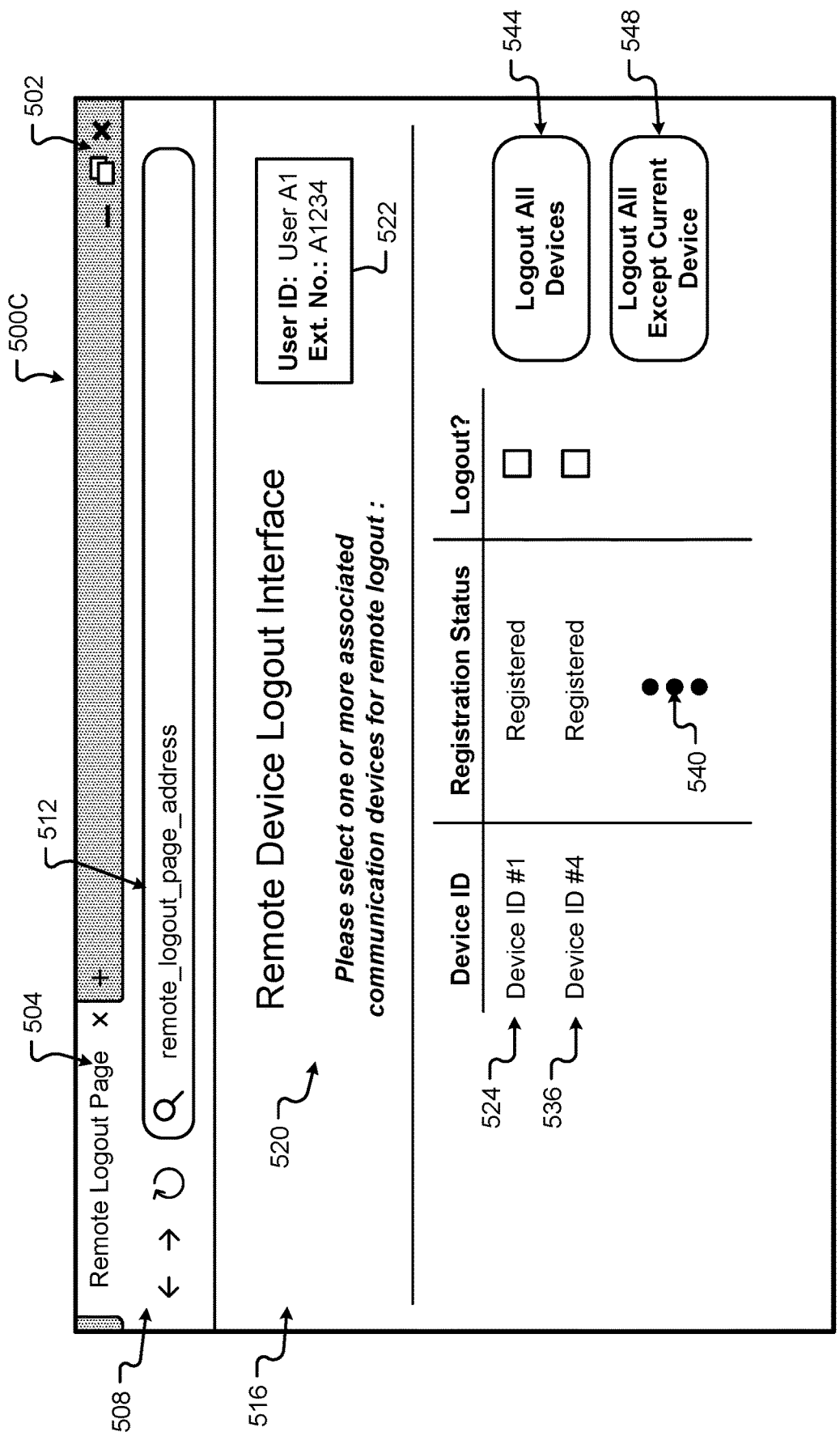
FIG. 5C is a block diagram depicting a third remote communication device logout interface presentation in accordance with embodiments of the present disclosure.

FIGS. 5A-5C show block diagrams of different interactive presentations, or browser application windows 504, rendered by a browser application 220 of the communication device 108 in accordance with embodiments of the present disclosure. Each browser application window 504 may be rendered as part of a browser application 220 to a display device 216 of the communication device 108. In some embodiments, the browser application window 504 may comprise one or more window controls 502, navigation controls 508, address bars 512, and presentation and/or user interaction areas 516. The presentation area 516 may comprise an area of the browser application window 504 that presents user interface areas (e.g., selection buttons, toggle boxes, text boxes, etc.), information areas, and/or other links to pages other than the address listed in the address bar 512 of the landing page. Although shown partitioned into one or more discrete viewing areas, embodiments of the browser application window 504 are not limited to the arrangements and layout shown in FIGS. 5A-5C. Additionally or alternatively, the information presented by the interface presentations 500A-500C shown in FIGS. 5A-5C may be provided via a pop-up notification, a toast, or other message displayed by the communication device 108 inside or outside of the browser application 220 (e.g., via an OS, or other application of the communication device 108, etc.).

The one or more window controls 502, when selected, may alter a position, size, or appearance of the browser application window 504. In some embodiments, these window controls 502 may include icons that, when selected, minimize the browser application window 504 (e.g., shown by the "_" symbol in the upper right-hand portion of the window 504), alter a window size of the browser application window 504 (e.g., shown by the double-rectangle symbol in the upper right-hand portion of the window 504), and close the browser application window 504 (e.g., shown by the "x" symbol in the upper right-hand portion of the window 504).

The browser application window 504 may include an identification of a page that is rendered in the presentation area 516 (e.g., "Remote Logout Page," etc.). As provided above, the browser application window 504 may comprise one or more navigation controls 508. The navigation controls 508 may allow a user 102 to navigate to a previous page, navigate to a subsequent page, and/or reload the current page using discrete icons and, in some cases, by providing a single-click selection. The browser application window 504 may comprise an address bar 512. The address bar 512 may receive an IP address, a website, a network address, and/or some other location on a wired or wireless network (e.g., the communication network 104, etc.). In some embodiments, the address bar 512 may accept search terms, perform a search of various addresses, sites, and/or the like, and provide results of the search in the browser application window 504.

In FIG. 5A, the first remote logout interface presentation 500A comprises a browser application window 504 displaying a remote logout page. As provided above, the first remote logout interface presentation 500A may be rendered to the display device 216 of a registered communication device 108 of the communication devices 108A-108N. The presentation area 516 of the remote logout page may comprise a remote logout information area 520, a registration identification area 522, a number of communication device detail rows 524-540, a logout all selection button 544, and a select logout selection button 548. The registration identification area 522 may include the identity of a user 102 (e.g., from the user identification field 312 of the registration data structure 300, etc.) and the extension number (e.g., from the extension number field 308 of the registration data structure 300, etc.). As illustrated in FIG. 5A, the user 102 is identified as "User A1" and the extension for the user 102 is identified as extension number "A1234."

The lower portion of the browser application window 504 may comprise a number of communication device detail rows 524-540 arranged as part of a table, or list. This table may include the identification of each communication device 108 listed (e.g., "Device ID"), the registration status of each communication device 108 listed (e.g., "Registration Status"), and an unregister selection option (e.g., "Logout") in the form of a selection box, button, toggle switch, etc., and/or combinations thereof. The unregister selection option associated with each row 524-540 may selectively and, in some cases, independently allow a user 102 to provide an input to terminate a registration for one or more of the communication devices 108 listed. The unregister selection option, provided as a selection check box, or selection option button, is configured to receive and record an input from a user 102, when selected. For instance, a user 102 may select the selection check box by providing a selection input (e.g., clicking, or touching, etc.) within the border of a respective selection check box. In one embodiment, the user 102 may provide the selection input via the user interface 202 of the communication device 108.

The table shows this detailed information listed in a first communication device detail row 524 (e.g., for "Device ID #1"), a second communication device detail row 528 (e.g., for "Device ID #2"), a third communication device detail row 532 (e.g., for "Device ID #3"), and a fourth communication device detail row 536 (e.g., for "Device ID #4"). More communication device detail rows 540 may be presented for additional communication devices that are registered with the extension of the user 102. In some embodiments, "Device ID #1" may correspond to the first communication device 108A, "Device ID #2" may correspond to the second communication device 108B, "Device ID #3" may correspond to the third communication device 108C, and "Device ID #4" may correspond to the fourth communication device 108D, as described above. In some embodiments, a logout all selection button 544 may be rendered as part of the browser application window 504 that allows a user 102 to provide a selection input that unregisters all of the communication devices that are currently registered with the extension of the user 102. Additionally or alternatively, a select logout selection button 548 may be rendered as part of the browser application window 504 that allows a user 102 to provide a selection input that unregisters all of the communication devices that are currently registered with the extension of the user 102 except for the requesting communication device 108 that the user 102 is using to remotely logout other registered communication devices 108A-108N.

Additionally or alternatively, the remote logout information area 520 may include one or more messages, images, instructions, and/or other content that is presented to a user 102 of the communication device 108. Among other things, the remote logout information area 520 shown in FIG. 5A comprises a "page identification" statement and an "instruction" to select one or more associated registered communication devices that the user 102 wishes to logout from the extension of the user 102.

FIG. 5B shows a second remote logout interface presentation 500B where the user 102 has selected the unregister selection options associated with "Device ID #2" and "Device ID #3." As illustrated in FIG. 5B, the selection check boxes, or selection option buttons, in the second communication device detail row 528 and third communication device detail row 532 are shown as selected (e.g., each comprising an "x" therein). Additionally or alternatively, the "Registration Status" of the second and third communication device detail rows 528, 532 has been updated to show that the user 102 has requested that "Device ID #2" and "Device ID #3" be unregistered, or logged out, from the extension of the user 102 (e.g., extension number "A1234"). For example, the registration status states that the respective communication devices (e.g., "Device ID #2" and "Device ID #3") are in the process of "Unregistering." In some embodiments, and as described in conjunction with FIGS. 7 and 8, this input provided by the user 102 may correspond to the unregister selection input provided by the user 102 via the display device 216 selecting a particular registered communication device 108 in the list. In response to providing this input, the communication device 108 the user 102 is using may send the unregister message to the SIP session manager server 112 to unregister the selected communication devices (e.g., the second communication device 108B and the third communication device 108C).

In the third remote logout interface presentation 500C shown in FIG. 5C, "Device ID #2" and "Device ID #3," selected by the user 102 for logging out (e.g., unregistering), have been removed from the list of registered communication devices shown in the presentation area 516 of the remote logout page. This updated third remote logout interface presentation 500C indicates that the previously selected communication devices (e.g., "Device ID #2" and "Device ID #3") have been successfully logged out of the extension of the user 102 and only "Device ID #1" and "Device ID #4" remain registered with the extension of the user 102.

Figure 6A:
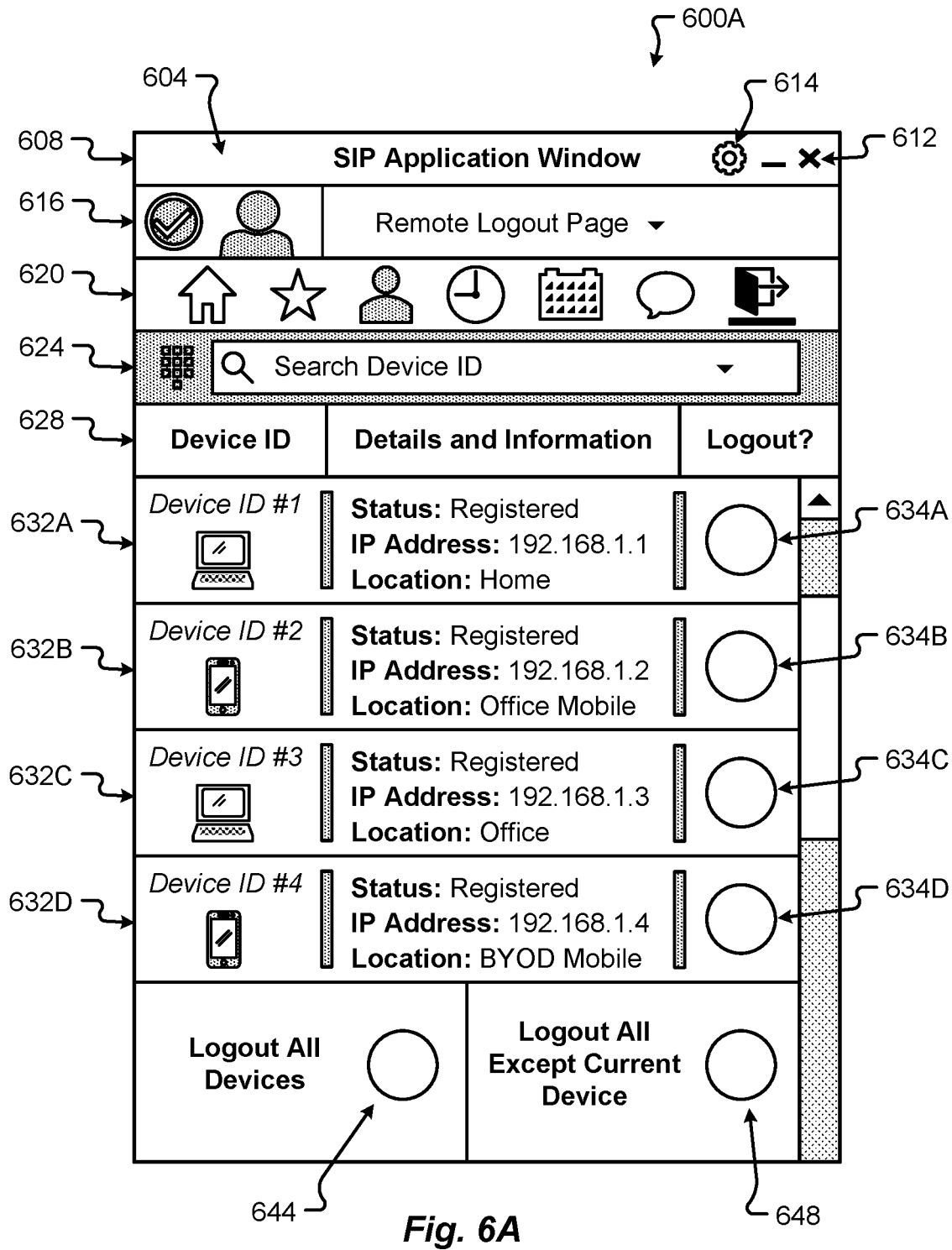
FIG. 6A is a block diagram depicting a first application interface presentation in accordance with embodiments of the present disclosure.
Figure 6B:
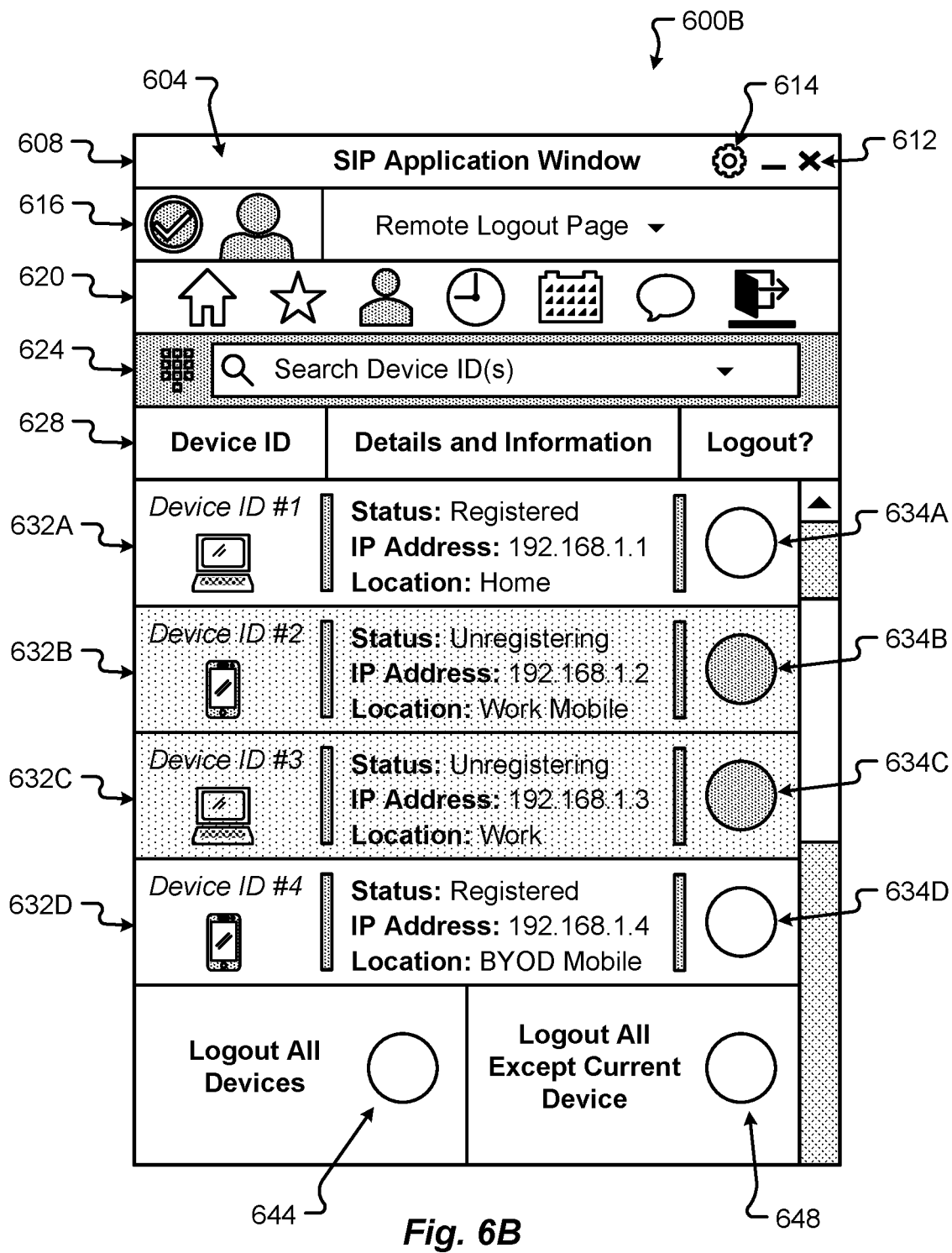
FIG. 6B is a block diagram depicting a second application interface presentation in accordance with embodiments of the present disclosure.
Figure 6C:
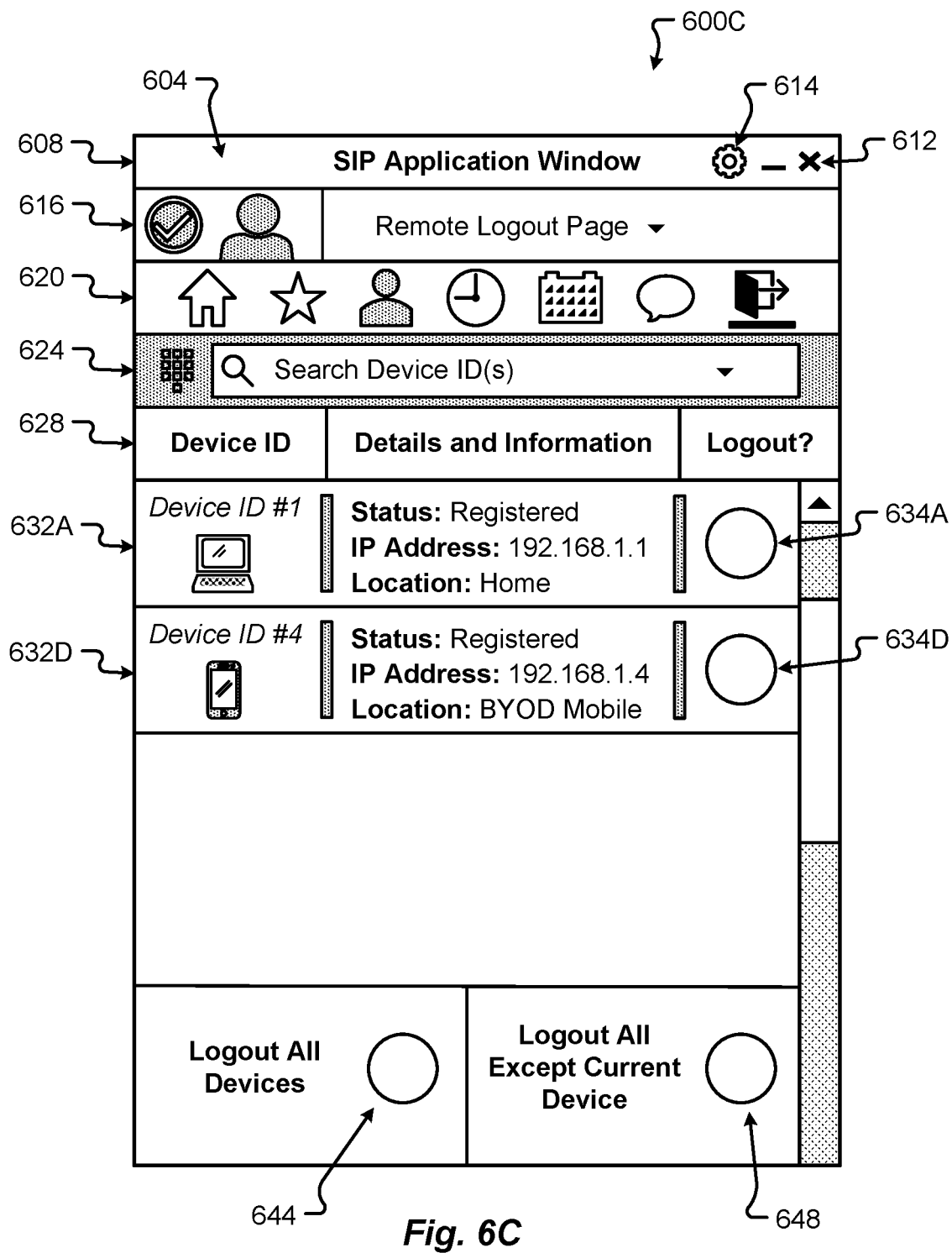
FIG. 6C is a block diagram depicting a third application interface presentation in accordance with embodiments of the present disclosure.

FIGS. 6A-6C show block diagrams depicting a user interface of the SIP application 224 of the communication device 108 rendering a remote logout page for interaction with a user 102. The SIP application window 604 can be presented to, or rendered by, a display device 216 of the communication device 108. In some embodiments, the SIP application window 604 may include a number of viewing areas including, but in no way limited to, a header panel 608 including one or more window controls 612, a user context area 616, a display selection icon area 620, a search area 624, and a device detail information header 626 including one or more communication device detail bars 632A-632D. Although shown partitioned into a discrete number of viewing areas, embodiments of the SIP application window 604 are not limited to the arrangement and layout shown in FIGS. 6A-6C.

The header panel 608 may include an identification of the SIP application 224 (e.g., "SIP Application Window," etc.) and the window controls 612. The window controls 612 may include icons that, when selected, minimize the SIP application window 604 (e.g., shown by the "_" symbol in the header panel 608), close the SIP application window 604 (e.g., shown by the "x" symbol in the header panel 608). Additionally or alternatively, the header panel 608 may include a settings selection control icon 614. The settings selection control icon 614, when selected (e.g., by the user 102), may allow the user 102 to set extension numbers, preferences, etc. These settings may be stored in the computer memory 208 of the communication device 108.

The user context area 616 may display presence status (e.g., indicated by the circular icon on the left-hand side of the user context area 616), an icon or image of the user 102, tab information, and other icons (e.g., a voicemail icon, etc.). As shown in FIGS. 6A-6C, the presence status indicated by the circular icon includes a check mark indicating that the user 102 is "available."

The display selection icon area 620 may include a number of icons that allow the user 102 to navigate between various application functions of the SIP application 224. These icons may include (from left to right) a "home" icon, a "favorites" (star) icon, a "contacts" icon, a "clock/timer" icon, a "calendar" icon, a "chat" icon, and a "remote logout" icon, to name a few. As shown in FIGS. 6A-6C, the remote logout icon is shown as underlined indicating that remote logout details, information, and options are displayed below the device detail information header 626 of the first, second, and third SIP application interface presentations 600A-600C.

In each SIP application interface presentation 600A-600C, a number of communication device detail bars 632A-632D are shown below the device detail information header 626. In some embodiments, each of the communication device detail bars 632A-632D may include a device identification (e.g., from the device identification field 304 of the registration data structure 300), a representative icon of the registered communication device 108, a registration status (e.g., "Status"), an IP address, a location or ownership type of the communication device 108, and a respective logout selection button 634A-634D. As shown in the first communication device detail bar 632A, the device identification is "Device ID #1" (e.g., corresponding to first communication device 108A) and the representative icon indicates that the associated communication device 108 is a desktop computer. Moreover, the first communication device detail bar 632A, shows the "Details and Information" associated with the first communication device 108A comprising the registration status of "Registered," that the IP address is "192.168.1.1," and the location or ownership type of the first communication device 108A is "Home." The first communication device detail bar 632A includes a first logout selection button 634A, also known as an unregister selection option (e.g., shown under the "Logout" section in the device detail information header 626) in the form of a selection box, button, toggle switch, etc., and/or combinations thereof. The logout selection button 634A-634D associated with each bar 632A-632D may selectively and, in some cases, independently allow a user 102 to provide an input to terminate a registration for one or more of the communication devices 108 listed. The unregister selection option, provided as a selection check box, or logout selection button 634A-634D, is configured to receive and record an input from a user 102, when selected. For example, a user 102 may select the logout selection button 634A-634D by providing a selection input (e.g., clicking, or touching, etc.) within the border of a respective logout selection button 634A-634D. In one embodiment, the user 102 may provide the selection input via the user interface 202 of the communication device 108.

In some embodiments, the communication device detail bars 632A-632D may be navigated via scrolling (e.g., via the scroll bar on the right-hand side of the SIP application window 604), and/or by dragging (e.g., via a touch and/or click interface input) the list of communication device detail bars 632A-632D.

Similar to the interfaces 500A-500C described in conjunction with FIGS. 5A-5C, the SIP application window 604 may comprise a logout all selection button 644 that is rendered to a portion thereof and that allows a user 102 to provide a selection input that unregisters all of the communication devices that are currently registered with the extension of the user 102. Additionally or alternatively, a select logout selection button 648 may be rendered as part of the SIP application window 604 that allows a user 102 to provide a selection input that unregisters all of the communication devices that are currently registered with the extension of the user 102 except for the requesting communication device 108 that the user 102 is using to remotely logout other registered communication devices 108A-108N (e.g., the communication device 108 running the SIP application 224 used to access the remote logout page of the SIP application window 604, etc.).

FIG. 6B shows a second SIP application interface presentation 600B where the user 102 has selected the logout selection buttons 634B, 634C associated with "Device ID #2" and "Device ID #3" shown in the second communication device detail bar 632B and the third communication device detail bar 632C, respectively. As illustrated in FIG. 6B, the second logout selection button 634B and the third logout selection button 634C are shown as selected (e.g., each comprising a filled background). Additionally or alternatively, the "Status" line in the "Details and Information" column of the second and third communication device detail bars 632B, 632C has been updated to show that the user 102 has requested that "Device ID #2" and "Device ID #3" be unregistered, or logged out, from the extension of the user 102 (e.g., listing the status as "Unregistering"). In some embodiments, and as described in conjunction with FIGS. 7 and 8, this input provided by the user 102 may correspond to the unregister selection input provided by the user 102 via the display device 216 selecting a particular registered communication device 108 in the list. In response to providing this input, the communication device 108 the user 102 is using may send the unregister message to the SIP session manager server 112 to unregister the selected communication devices (e.g., the second communication device 108B and the third communication device 108C). In some embodiments, once a selected communication device 108 has been selected for logging out, or requested to be unregistered, the communication device detail bar 632A-632D associated with the selected communication device 108 may be highlighted or "greyed out" as shown in FIG. 6B.

In the third SIP application interface presentation 600C shown in FIG. 6C, "Device ID #2" and "Device ID #3," previously selected by the user 102 for logging out, or unregistering, have been removed from the list of registered communication devices shown in the SIP application window 604. This updated third SIP application interface presentation 600C, omitting "Device ID #2" and "Device ID #3," indicates to the user 102 that the previously selected communication devices (e.g., "Device ID #2" and "Device ID #3") have been successfully logged out of the extension of the user 102 and that only "Device ID #1" and "Device ID #4" remain registered with the extension of the user 102.

Figure 7:
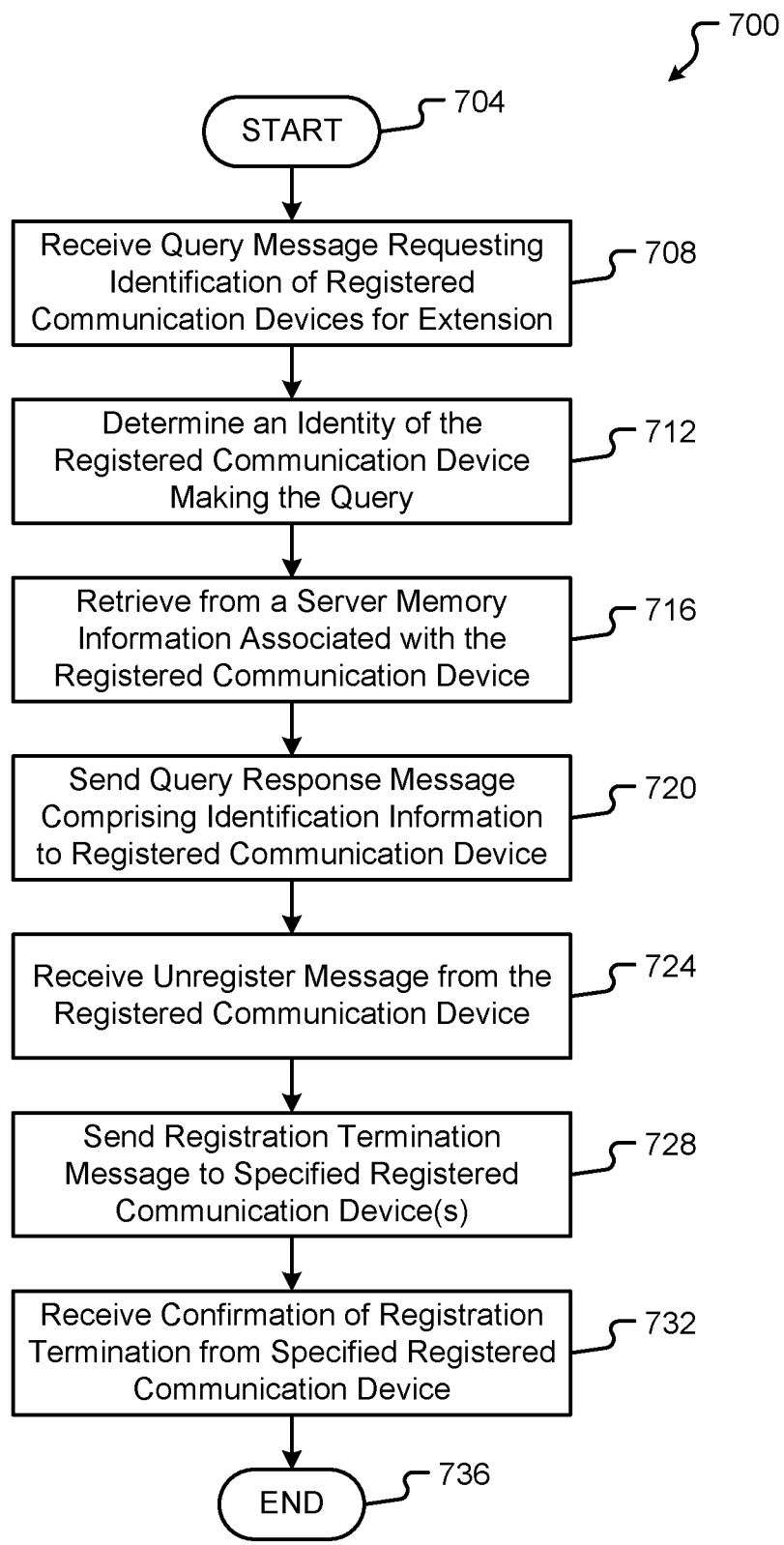
FIG. 7 is a flow diagram depicting a method of unregistering a communication device from an extension in response to receiving a remote unregister request from a registered communication device in accordance with at least some embodiments of the present disclosure.

FIG. 7 is a flow diagram depicting a method 700 of unregistering a communication device 108A-108N from an extension in response to receiving a remote unregister request from a registered communication device 108 in accordance with at least some embodiments of the present disclosure. The method 700 can be executed as a set of computer-executable instructions (e.g., registration instructions 136, interaction instructions 140, etc.) executed by a computer system (e.g., the SIP session manager server 112, the processor 124, etc.) and encoded or stored on a computer readable medium (e.g., memory 128, etc.). Hereinafter, the method 700 shall be explained with reference to the systems, components, modules, applications, software, data structures, user interfaces, etc. described in conjunction with FIGS. 1-6B.

The method 700 begins at step 704 and proceeds by receiving a query message requesting an identification of registered communication devices 108A-108N associated with an extension of a user 102 in a multiple-device access environment (step 708). In some embodiments, the query message may be received from a first communication device 108A of the communication devices 108A-108N that is registered with the extension of the user 102. As described in conjunction with FIG. 4, the query message may correspond to a SIP REGISTER message, sent by the first communication device 108A, that queries for all registered contacts, or communication devices 108A-108N, for the user 102 and the extension of the user 102. The query message may be received by the SIP session manager server 112.

In some embodiments, the method 700 may continue by the SIP session manager server 112 determining an identity of the registered first communication device 108A making the query (step 712). Determination of the identity may comprise the SIP session manager server 112 determining an identification comprising an IP address, a MAC address, a name, or other identity of the first communication device 108A. The identification of the first communication device 108A, the user 102, and/or the extension of the user 102 may be provided as part of the query message. This identification information may be extracted from the query message via the SIP session manager server 112.

In response to determining the identity of the first communication device 108A, the method 700 may proceed by the SIP session manager server 112 retrieving, from a memory (e.g., memory 128 and/or registration data database 116, etc.) information associated with the first communication device 108A comprising at least one of the extension, an identity of the user 102, and the identification of registered communication devices 108A-108N associated with the extension of the user 102 (step 716). In some embodiments, this information may be retrieved from the registration data structure 300.

Next, the method 700 proceeds by sending, via the processor 124 of the SIP session manager server 112 a query response message comprising the identification of registered communication devices 108A-108N associated with the extension to the first communication device 108A (step 720). This query response message may correspond to a SIP 200 OK message sent by the SIP session manager server 112 that returns all recorded bindings (e.g., registrations, etc.) for the extension of the user 102. In some embodiments, the query response message may comprise a registration status, a device identification, an IP address, a MAC address, a location, and/or a device type (e.g., represented by an icon, description, etc.) for each communication devices 108A-108N registered with the extension of the user 102. Once sent to the first communication device 108A, the user 102 may select one or more of the registered communication devices 108A-108N to unregister, or logout, from the extension of the user 102.

The method 700 continues by receiving an unregister message from the first communication device 108A comprising instructions to unregister at least one registered communication device 108 of the registered communication devices 108A-108N from the extension of the user 102 (step 724). For example, the unregister message may comprise instructions to unregister a second communication device 108B registered with the extension of the user 102. In some embodiments, this message may be sent as a SIP NOTIFY message comprising a list of bindings to be terminated (e.g., unregister second communication device 108B, third communication device 108C, etc.).

In response to receiving the unregister message, the method 700 may continue by sending a registration termination message to, for example, the second communication device 108B, and/or any other user-selected communication device 108, registered with the extension of the user 102 (step 728). The registration termination message may comprise instructions that terminates a registration of the second communication device 108B, and/or any other user-selected communication device 108, with the extension of the user 102. This registration termination message may be sent by the SIP session manager server 112 to the second communication device 108B as part of a SIP NOTIFY message. This SIP NOTIFY message may define that EVENT reg status=terminated. In some embodiments, the method 700 may continue by receiving confirmation of the registration termination (i.e., remote logout) from the specified communication device 108 (e.g., the second communication device 108B, etc.). The confirmation may be part of an acknowledgment message, for example, in the form of a SIP 200 OK message, etc. The method 700 may end at step 736.

In one embodiment, after step 720, the method 700 may proceed by the communication device 108 of the user 102 sending the registration termination message, or command, directly to the user-selected registered communication device(s) 108A-108N to be logged out (e.g., without the SIP session manager server 112 sending the unregister message, etc.). In this embodiment, the registration termination message issued by the communication device 108 of the user 102 may comprise the instructions that unregisters the user-selected registered communication device(s) 108A-108N from the extension of the user 102. For instance, after receiving the query response message from the SIP session manager server 112 (e.g., listing all of the registered communication devices 108A-108N, etc.), the registered communication device 108 of the user 102, from which the query was made, may use the device identification to directly communicate with one or more selected registered communication devices 108A-108N to be unregistered, or logged out, from the extension of the user 102. This direct communication may include sending the registration termination message to the one or more selected registered communication devices 108A-108N to be unregistered, without sending an unregister request to the SIP session manager server 112. Stated another way, the registered communication device 108 of the user 102, from which the query was made, sends the registration termination message to the one or more selected registered communication devices 108A-108N to be unregistered in lieu of the SIP session manager server 112 sending the registration termination message to the one or more selected registered communication devices 108A-108N to be unregistered. The registration termination message sent by the communication device 108 of the user may correspond to the same type of message (e.g., SIP NOTIFY message, etc.) as described above an in conjunction with step 728 of the method 700.

Figure 8:
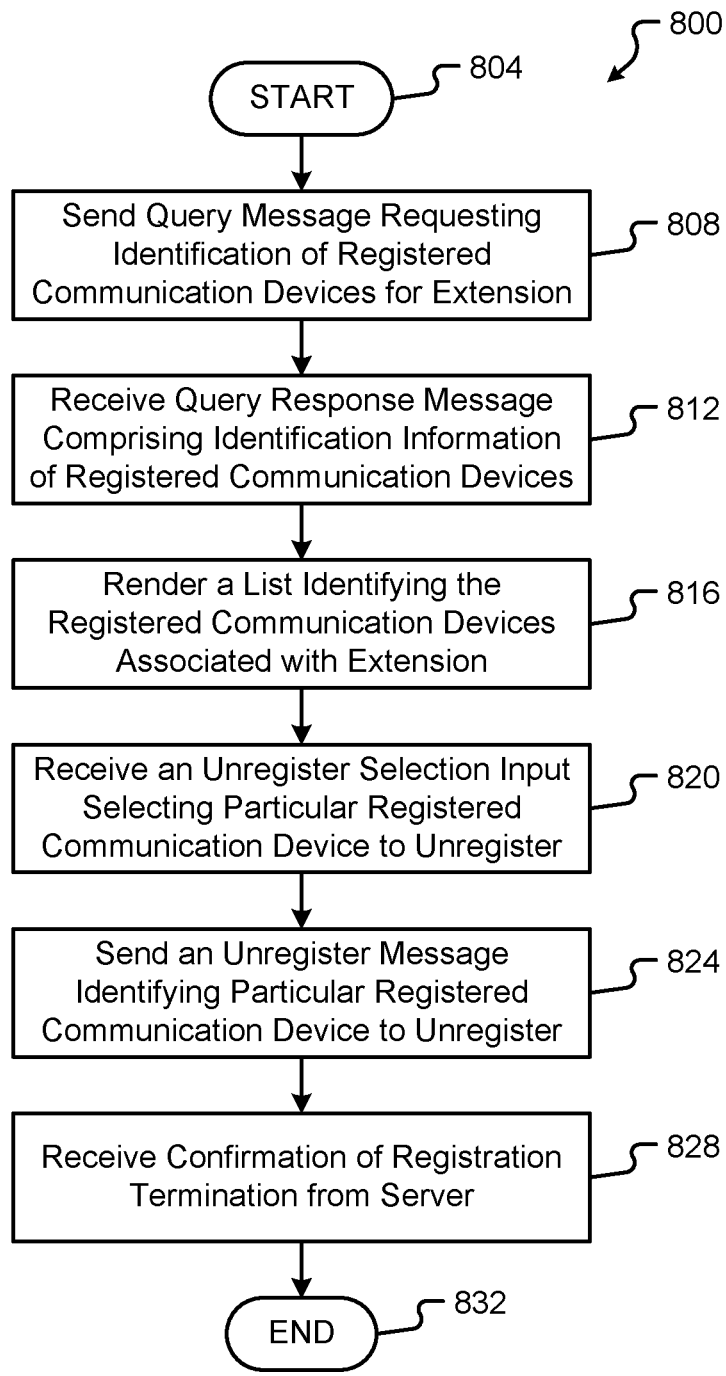
FIG. 8 is a flow diagram depicting a method of remotely unregistering a communication device from an extension via a registered communication device in accordance with embodiments of the present disclosure.

FIG. 8 is a flow diagram depicting a method 800 of remotely unregistering a communication device 108A-108N from an extension via a registered communication device 108 in accordance with embodiments of the present disclosure. The method 800 can be executed as a set of computer-executable instructions (e.g., SIP application 224, etc.) executed by a computer system (e.g., the communication device 108, etc.) and encoded or stored on a computer readable medium (e.g., the computer memory 208, etc.). Hereinafter, the method 800 shall be explained with reference to the systems, components, modules, applications, software, data structures, user interfaces, methods, etc. described in conjunction with FIGS. 1-7.

The method 800 begins at step 804 and proceeds by sending, from a communication device 108 registered with an extension of a user 102, a query message requesting an identification of registered communication devices 108A-108N associated with the extension of the user 102 (step 808). As provided above, this extension is the same extension with which the communication device 108 making the query is registered. The query message may correspond to a SIP REGISTER message that queries the SIP session manager server 112 for all registered contacts, or registered communication devices 108A-108N, for the user 102 and, more specifically, the extension of the user 102. In some embodiments, the query message may be sent without use of a remote client running on the communication device.

The method 800 continues by receiving, via the network interface 206, a query response message comprising the identification of registered communication devices 108A-108N associated with the extension of the user 102 (step 812). In some embodiments, the query response message may correspond to a SIP 200 OK message sent by the SIP session manager server 112 that returns all recorded bindings (e.g., registrations, etc.) for the extension of the user 102. In some embodiments, the identification of the registered communication devices 108A-108N associated with the extension of the user 102 may be in the form of a list.

The method 800 continues by rendering a list identifying the registered communication devices 108A-108N associated with the extension of the user 102 to a portion of the display device 216 of the first communication device 108A (e.g., the communication device 108 making the remote logout request, queries, etc.)(step 816). In some embodiments, the list may be rendered as part of a browser application window 504 and/or a SIP application window 604, as described in conjunction with FIGS. 5A-5B and 6A-6B, respectively.

Next, the method 800 proceeds when a user 102 provides an unregister selection input of one or more registered communication devices 108A-108N to unregister from the extension of the user 102 (step 820). In some embodiments, the unregister selection input may be provided by the user 102 via the display device 216 selecting a particular registered communication device 108A-108N in the list rendered to the display device 216. The unregister selection input may be provided by a user 102 selecting a button, checking a box, touching a toggle button, and/or otherwise providing an input to logout one or more communication devices 108A-108N that are registered with the extension of the user 102.

Once the selection of at least one communication device 108A-108N is made by the user 102, the method 800 may continue by sending, for example, across the communication network 104 via the network interface 206, an unregister message to the SIP session manager server 112 managing the multiple-device access environment (step 824). The unregister message may comprise instructions to unregister the particular (e.g., user-selected) registered communication device 108 from the extension of the user 102. In some embodiments, this unregister message may be sent as a SIP NOTIFY message comprising a list of bindings to be terminated (e.g., unregister second communication device 108B, unregister third communication device 108C, etc.). In response to receiving the unregister message, the SIP session manager server 112 may send a registration termination message to, for example, the second communication device 108B, and/or any other user-selected communication device 108, registered with the extension of the user 102 as described in conjunction with step 728 of FIG. 7 above. The SIP session manager server 112 may receive confirmation of the registration termination, or remote logout, from the specified communication device 108 (e.g., the second communication device 108B, the third communication device 108C, etc.). The confirmation may be part of an acknowledgment message, for example, in the form of a SIP 200 OK message, etc., received from the unregistered communication device 108. In one embodiment, this confirmation of registration termination may be provided to the first communication device 108A (step 828). For instance, the first communication device 108A may receive confirmation in the form of a new list of registered communication devices 108A-108N excluding the unregistered, or logged out, communication device(s) 108. The method 800 ends at step 832.

In one embodiment, after step 820 and in lieu of performing step 824, the method 800 may continue by the communication device 108 of the user 102 sending the registration termination message, or command, directly to the user-selected registered communication device(s) 108A-108N to be logged out (e.g., without the SIP session manager server 112 sending the unregister message, etc.). In this embodiment, the registration termination message issued by the communication device 108 of the user 102 may comprise the instructions that unregisters the user-selected registered communication device(s) 108A-108N from the extension of the user 102. For instance, after receiving the query response message from the SIP session manager server 112 (e.g., listing all of the registered communication devices 108A-108N, etc.), the registered communication device 108 of the user 102, from which the query was made, may use the device identification to directly communicate with one or more selected registered communication devices 108A-108N to be unregistered, or logged out, from the extension of the user 102. This direct communication may include sending the registration termination message to the one or more selected registered communication devices 108A-108N to be unregistered, without sending an unregister request to the SIP session manager server 112. Stated another way, the registered communication device 108 of the user 102, from which the query was made, sends the registration termination message to the one or more selected registered communication devices 108A-108N to be unregistered in lieu of the SIP session manager server 112 sending the registration termination message to the one or more selected registered communication devices 108A-108N to be unregistered. The registration termination message sent by the communication device 108 of the user may correspond to the same type of message (e.g., SIP NOTIFY message, etc.) as described above an in conjunction with step 728 of the method 700 described in conjunction with FIG. 7.

Any of the steps, functions, and operations discussed herein can be performed continuously and automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a server, comprising: a communications interface; a processor coupled to the communications interface; and a memory coupled to and readable by the processor and storing therein instructions that, when executed by the processor, cause the processor to: receive, via the communications interface, a query message requesting an identification of registered communication devices associated with an extension of a user, wherein the query message is received from a first registered communication device of the registered communication devices; send, across a communication network via the communications interface, a query response message comprising the identification of registered communication devices associated with the extension to the first registered communication device; receive, via the communications interface, an unregister message from the first registered communication device comprising instructions to unregister a second registered communication device of the registered communication devices from the extension; and send, via the communications interface in response to receiving the unregister message, a registration termination message to the second registered communication device comprising instructions that terminates a registration of the second registered communication device with the extension. Aspects of the above server include wherein the query message is received directly from the first registered communication device without use of a remote client running on the first registered communication device. Aspects of the above server include wherein the query message is received directly from the first registered communication device without use of a third-party web interface, application, and product. Aspects of the above server include wherein the identification of registered communication devices associated with the extension comprises an Internet Protocol ("IP") address and Media Access Control ("MAC") address for each of the registered communication devices. Aspects of the above server include wherein the query response message causes the identification of registered communication devices associated with the extension to be rendered as a list by a display device of the first registered communication device. Aspects of the above server include wherein the unregister message further comprises instructions to unregister a third registered communication device of the registered communication devices from the extension, and wherein the instructions that, when executed by the processor, further cause the processor to send, via the communications interface, the registration termination message to the third registered communication device comprising instructions that terminate a registration of the third registered communication device with the extension. Aspects of the above server include wherein each of the registered communication devices are Session Initiation Protocol ("SIP") devices that are simultaneously registered with the server with the extension in a multiple-device access environment, and wherein the server is a SIP session manager server. Aspects of the above server include wherein the query message is part of a SIP REGISTER message received from the first registered communication device, wherein the query response message is part of a SIP 200 OK message, wherein the unregister message is a SIP NOTIFY message comprising at least one binding to be terminated from the extension, and wherein the registration termination message is a SIP EVENT message comprising information that the registration of the second registered communication device with the extension is terminated.

Embodiments of the present disclosure include a method, comprising: receiving, via a processor, a query message requesting an identification of registered communication devices associated with an extension of a user in a multiple-device access environment, wherein the query message is received from a first registered communication device of the registered communication devices; sending, via the processor, a query response message comprising the identification of registered communication devices associated with the extension to the first registered communication device; receiving, via the processor, an unregister message from the first registered communication device comprising instructions to unregister a second registered communication device of the registered communication devices from the extension; and sending, via the processor in response to receiving the unregister message, a registration termination message to the second registered communication device comprising instructions that terminates a registration of the second registered communication device with the extension. Aspects of the above method include wherein the query message is received directly from the first registered communication device without use of a remote client running on the first registered communication device. Aspects of the above method include wherein the identification of registered communication devices associated with the extension comprises an Internet Protocol ("IP") address and a Media Access Control ("MAC") address for each of the registered communication devices. Aspects of the above method include wherein prior to sending the query response message, the method further comprises: determining, via the processor, an identity of the first registered communication device; and retrieving, via the processor and based on the identity determined, from a memory associated with a Session Initiation Protocol ("SIP") session manager server information associated with the first registered communication device comprising at least one of the extension, an identity of the user, and the identification of registered communication devices associated with the extension. Aspects of the above method include wherein the query response message causes the identification of registered communication devices associated with the extension to be rendered as a list by a display device of the first registered communication device. Aspects of the above method include wherein each of the registered communication devices are Session Initiation Protocol ("SIP") devices that are simultaneously registered with a SIP session manager server with the extension in a multiple-device access environment, wherein the query message is part of a SIP REGISTER message received from the first registered communication device, wherein the query response message is part of a SIP 200 OK message, wherein the unregister message is a SIP NOTIFY message comprising at least one binding to be terminated from the extension, and wherein the registration termination message is a SIP EVENT message comprising information that the registration of the second registered communication device with the extension is terminated.

Embodiments of the present disclosure include a communication device registered with an extension of a user in a multiple-device access environment, comprising: a display device; a communications interface; a processor coupled to the display device and the communications interface; and a memory coupled to and readable by the processor and storing therein instructions that, when executed by the processor, cause the processor to: send, across a communication network via the communications interface, a query message requesting an identification of registered communication devices associated with the extension; receive, via the communications interface, a query response message comprising the identification of registered communication devices associated with the extension; render a list identifying the registered communication devices associated with the extension to a portion of the display device; receive an unregister selection input provided by the user via the display device selecting a particular registered communication device in the list; and send, across the communication network via the communications interface in response to receiving the unregister selection input, an unregister message to a server managing the multiple-device access environment comprising instructions to unregister the particular registered communication device from the extension.

Aspects of the above communication device include wherein the query message is sent as a Session Initiation Protocol ("SIP") REGISTER message without use of a remote client running on the communication device. Aspects of the above communication device include wherein the unregister message further comprises instructions to unregister another registered communication device of the registered communication devices from the extension, and wherein each of the registered communication devices are SIP devices that are simultaneously registered with the server with the extension in the multiple-device access environment, and wherein the server is a SIP session manager server. Aspects of the above communication device include wherein rendering the list identifying the registered communication devices associated with the extension to a portion of the display device comprises instructions that, when executed by the processor, cause the processor to: render information about each registered communication device in the registered communication devices comprising at least one of a device identification, a registration status, a location, and a logout option for each registered communication device. Aspects of the above communication device include wherein the logout option comprises a selection button area of the display device that receives the unregister selection input from the user. Aspects of the above communication device include wherein the information about each registered communication device in the registered communication devices is rendered via at least one of a browser application and a SIP application running on the communication device.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARIVI926EJS™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A server, comprising:
   a communications interface;
   a processor coupled to the communications interface; and
   a memory coupled to and readable by the processor and storing therein instructions that, when executed by the processor, cause the processor to:
   receive, via the communications interface, a query message requesting an identification of registered communication devices associated with an extension of a user, wherein the query message is received directly from a first registered communication device of the registered communication devices without use of a remote client running on the first registered communication device, and wherein the first registered communication device is not in an active communication session;
   send, across a communication network via the communications interface, a query response message comprising the identification of the registered communication devices associated with the extension of the user;
   receive, via the communications interface, an unregister message from the first registered communication device comprising instructions to unregister a second registered communication device of the registered communication devices from the extension; and
   send, via the communications interface in response to receiving the unregister message, a registration termination message to the second registered communication device comprising instructions that terminate a registration of the second registered communication device with the extension.

2. The server of claim 1, wherein the query message is a Session Initiation Protocol ("SIP") REGISTER message that queries for all registered communication devices associated with the extension of the user, and wherein the query response message comprises all recorded bindings for the extension.

3. The server of claim 1, wherein the query message is received directly from the first registered communication device without use of a third-party web interface, application, and product.

4. The server of claim 1, wherein the identification of the registered communication devices associated with the extension comprises an Internet Protocol ("IP") address and a Media Access Control ("MAC") address for each of the registered communication devices.

5. The server of claim 1, wherein the query response message causes the identification of the registered communication devices associated with the extension to be rendered as a list by a display device of the first registered communication device.

6. The server of claim 1, wherein the unregister message further comprises instructions to unregister a third registered communication device of the registered communication devices from the extension, and wherein the instructions that, when executed by the processor, further cause the processor to send, via the communications interface, the registration termination message to the third registered communication device comprising instructions that terminate a registration of the third registered communication device with the extension.

7. The server of claim 1, wherein each of the registered communication devices are Session Initiation Protocol ("SIP") devices that are simultaneously registered with the server with the extension in a multiple-device access environment, and wherein the server is a SIP session manager server.

8. The server of claim 7, wherein the query message is part of a SIP REGISTER message received from the first registered communication device, wherein the query response message is part of a SIP 200 OK message, wherein the unregister message is a SIP NOTIFY message comprising at least one binding to be terminated from the extension, and wherein the registration termination message is a SIP EVENT message comprising information that the registration of the second registered communication device with the extension is terminated.

9. A method, comprising:
sending, via a processor of a first registered communication device, a query message requesting an identification of registered communication devices associated with an extension of a user in a multiple-device access environment, wherein the query message is sent directly from the first registered communication device without use of a remote client running on the first registered communication device;
receiving, via the processor of the first registered communication device, a query response message comprising all registered communication devices associated with the extension of the user;
displaying, via a user interface, a list of all the registered communication devices associated with the extension of the user;
receiving, via the processor, an unregister selection input provided by the user via the user interface, selecting a second registered communication device from the displayed list of all the registered communication devices associated with the extension of the user; and
sending, via the processor of the first registered communication device, a registration termination message to the selected second registered communication device comprising instructions that terminate a registration of the second registered communication device with the extension wherein the registration termination message is sent directly from the first registered communication device to the second registered communication device.

10. The method of claim 9, wherein the query message is a Session Initiation Protocol ("SIP") REGISTER message that queries for all the registered communication devices associated with the extension of the user, and wherein the query response message comprises all recorded bindings for the extension.

11. The method of claim 9, wherein the identification of all the registered communication devices associated with the extension comprises an Internet Protocol ("IP") address and a Media Access Control ("MAC") address for each of the registered communication devices.

12. The method of claim 9, wherein each of the registered communication devices are Session Initiation Protocol ("SIP") devices that are simultaneously registered with a SIP session manager server with the extension in the multiple-device access environment, wherein the query message is part of a SIP REGISTER message received from the first registered communication device, wherein the query response message is part of a SIP 200 OK message, and wherein the registration termination message is a SIP EVENT message comprising information that the registration of the second registered communication device with the extension is terminated.

13. A communication device registered with an extension of a user in a multiple-device access environment, comprising:
a display device;
a communications interface;
a processor coupled to the display device and the communications interface; and
a memory coupled to and readable by the processor and storing therein instructions that, when executed by the processor, cause the processor to:
send, across a communication network via the communications interface, a query message requesting an identification of registered communication devices associated with the extension of the user without use of a remote client running on the communication device;
receive, via the communications interface, a query response message identifying the registered communication devices associated with the extension;
render a list of the identified registered communication devices associated with the extension to a portion of the display device;
receive an unregister selection input provided by the user via the display device selecting a particular registered communication device in the list; and
send, across the communication network via the communications interface in response to receiving the unregister selection input, an unregister message comprising instructions to unregister the particular registered communication device from the extension wherein the unregister message is sent directly from the communication device to the particular registered communication device.

14. The communication device of claim 13, wherein the query message is sent as a Session Initiation Protocol ("SIP") REGISTER message.

15. The communication device of claim 14, wherein each of the registered communication devices are SIP devices that are simultaneously registered with a server managing a multiple device access environment with the extension in the multiple-device access environment, and wherein the server is a SIP session manager server.

16. The communication device of claim 13, wherein rendering the list identifying the registered communication devices associated with the extension to the portion of the display device comprises instructions that, when executed by the processor, cause the processor to:
render information about each registered communication device in the registered communication devices comprising at least one of a device identification, a registration status, a location, and a logout option for each registered communication device.

17. The communication device of claim 16, wherein the logout option comprises a selection button area of the display device that receives the unregister selection input from the user, and wherein the information about each registered communication device in the registered communication devices is rendered via at least one of a browser application and a SIP application running on the communication device.

* * * * *